US012652327B1

(12) United States Patent
Sparhawk et al.

(10) Patent No.: US 12,652,327 B1
(45) Date of Patent: Jun. 9, 2026

(54) MULTI-WAY AUDIO FILTERING

(71) Applicant: SimpliSafe, Inc., Boston, MA (US)

(72) Inventors: Robert Sparhawk, Salem, MA (US);
Ali Tawbeh, Franklin, MA (US); **Alan
Willard, Norton, MA (US); Joey
Wong**, Foster City, CA (US)

( * ) Notice: Subject to any disclaimer, the term of this
patent is extended or adjusted under 35
U.S.C. 154(b) by 0 days.

(21) Appl. No.: 19/229,591

(22) Filed: Jun. 5, 2025

(51) Int. Cl.
*H04L 65/403* (2022.01)
*H04L 65/1066* (2022.01)
*H04L 67/12* (2022.01)
*G08B 13/196* (2006.01)

(52) U.S. Cl.
CPC ...... *H04L 65/4046* (2013.01); *H04L 65/1066*
(2013.01); *H04L 67/12* (2013.01); *G08B
13/196* (2013.01)

(58) Field of Classification Search
CPC ............... H04L 12/1818; H04L 65/403; H04L
65/4046; H04L 51/04; H04L 65/1066;
H04L 65/1093; H04L 65/1104; H04L
65/4015; H04L 65/4038; H04L 69/14;
H04N 23/667; H04N 21/41407; G06F
3/167; G06F 3/165; G08B 7/06; G08B
25/006; G08B 13/19602; G08B 13/19663;
G08B 21/0297; G08B 25/012; G08B
25/08; G08B 25/12
See application file for complete search history.

(56) References Cited

U.S. PATENT DOCUMENTS

| | | | | |
|---|---|---|---|---|
| 10,380,854 | B1 * | 8/2019 | Yu | ..................... G08B 13/19602 |
| 10,764,442 | B1 * | 9/2020 | Delaney | ................ H04M 3/568 |
| 10,942,992 | B2 * | 3/2021 | Uzelac | ................ H04W 12/068 |
| 11,563,855 | B1 * | 1/2023 | Spivak | ................... H04L 67/306 |
| 11,792,455 | B1 * | 10/2023 | Fu | ........................... G06V 10/82 |
| | | | | 315/297 |
| 11,924,256 | B2 * | 3/2024 | Wang | .................... H04L 65/403 |
| 11,979,616 | B1 | 5/2024 | Wong et al. | |
| 2005/0259694 | A1 | 11/2005 | Garudadri et al. | |
| 2006/0265262 | A1 * | 11/2006 | Kamdar | .............. G06Q 10/109 |
| | | | | 705/80 |
| 2007/0050451 | A1 * | 3/2007 | Caspi | ...................... H04M 3/56 |
| | | | | 709/204 |
| 2011/0137438 | A1 | 6/2011 | Zhang | |
| 2013/0109365 | A1 * | 5/2013 | Buzdugan | ............. H04W 76/40 |
| | | | | 455/416 |
| 2013/0165171 | A1 * | 6/2013 | Pai | ........................ H04W 76/45 |
| | | | | 455/518 |
| 2014/0142951 | A1 | 5/2014 | Crawley et al. | |
| 2016/0065898 | A1 | 3/2016 | Lee | |

(Continued)

OTHER PUBLICATIONS

Kikuchi, Yusuke, et al., "Mobile Cross Reality (XR) space for
remote collaboration", AHFE Open Access, 2022, Human Factors
in Virtual Environments and Game Design, vol. 50, pp. 25-31.
USA.http://doi.org/10.54941/ahfe1002057.

*Primary Examiner* — David R Lazaro

(74) *Attorney, Agent, or Firm* — Secant IP, PLLC

(57) ABSTRACT

Enclosed is a method comprising sharing audio data among
a camera, a mobile device and a server via a virtual room,
identifying the server as having priority over the mobile
device, transmitting audio data from the server to the camera
while suppressing transmission of audio data from the
mobile device to the camera, and transmitting media data
from the camera to both the mobile device and the server.

20 Claims, 20 Drawing Sheets

(56)     References Cited

U.S. PATENT DOCUMENTS

| | | | |
|---|---|---|---|
| 2016/0337302 A1* | 11/2016 | Ko | H04M 3/566 |
| 2017/0094457 A1* | 3/2017 | Lee | H04W 4/10 |
| 2019/0075171 A1* | 3/2019 | Childress | H04W 4/08 |
| 2020/0171394 A1 | 6/2020 | Khan et al. | |
| 2020/0280702 A1* | 9/2020 | Singh | G06N 3/04 |
| 2021/0026019 A1* | 1/2021 | Gahagan | G01S 17/931 |
| 2022/0109758 A1 | 4/2022 | Abhishek et al. | |
| 2023/0036647 A1* | 2/2023 | La Barrie | G06N 3/04 |
| 2024/0179191 A1 | 5/2024 | Yerli | |
| 2024/0179354 A1 | 5/2024 | Yerli | |
| 2024/0214436 A1 | 6/2024 | Escoda et al. | |
| 2024/0256693 A1* | 8/2024 | Wong | G06F 21/6218 |
| 2025/0008301 A1* | 1/2025 | Narasimhan | H04N 7/183 |

* cited by examiner

Figure 11:
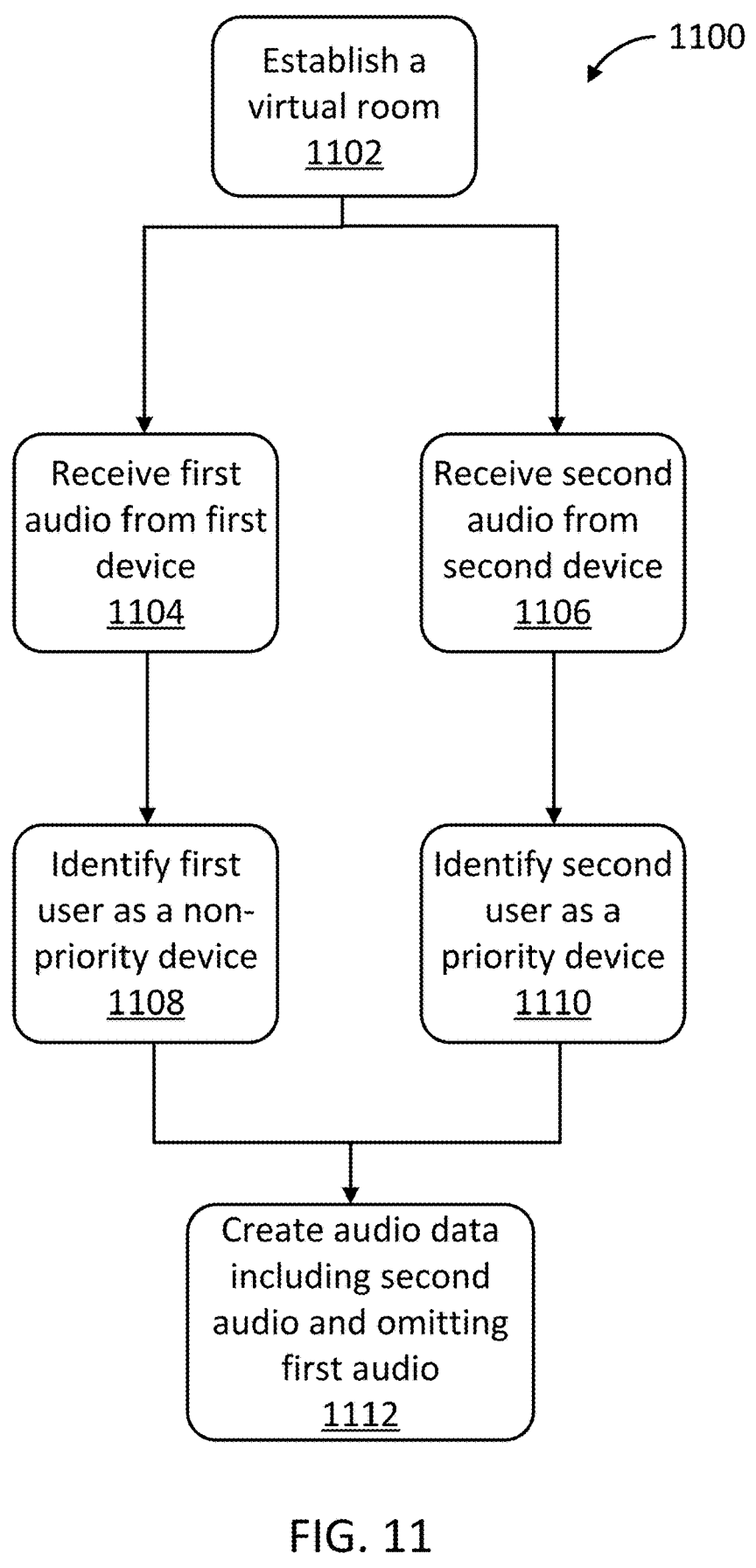

Establish a
virtual room
1102

Receive first
audio from first
device
1104

Receive second
audio from
second device
1106

Identify first
user as a non-
priority device
1108

Identify second
user as a
priority device
1110

Create audio data
including second
audio and omitting
first audio
1112

Processor
1202

Volatile
Memory
1204

Interface(s)
1206

Non-volatile
Memory
1208

Code
1210

Data
1212

1114

1400

708

Priority Audio
Data ←

Stream Creation Device
1402

Customer Devices
122

Customer
Interfaces
132

Customer
Audio
Data →

Computing Devices
518

Agency Interfaces
130

Agent
Audio
Data →

1500

Receive Audio Data Inbound from a Server and Mobile Device(s)
1502

Identify Server as Having Priority Over Mobile Device(s)
1504

Mix the Audio Data into an Outbound Stream
1506

1400

708

Priority Audio Data

Stream Creation Device
1402

Virtual Camera
704

Customer Devices
122

Customer Interfaces
132

Customer Audio Data

Audio Data

Selective Forwarding Unit (SFU)
710

Virtual Room
702

Computing Devices
518

Agency Interfaces
130

Agent Audio Data

1800

Receive Token from
Mobile Device
1802

Match a Value of a
Field in the Token
to a Value within
Set of Priority
Values
1804

Assign the Matching
Value to the Priority
of the Mobile
Device
1806

MULTI-WAY AUDIO FILTERING

TECHNICAL FIELD

Aspects of the technologies described herein relate to monitoring systems and methods, more particularly, to communication systems and methods utilizing the same.

BACKGROUND

Some monitoring systems use one or more cameras to capture images of areas around or within a residence or business location. Such monitoring systems can process images locally and transmit the captured images to a remote service. If motion is detected, the monitoring systems can send an alert to one or more user devices.

BRIEF DESCRIPTION OF THE DRAWINGS

Additional examples of the disclosure, as well as features and advantages thereof, will become more apparent by reference to the description herein taken in conjunction with the accompanying drawings which are incorporated in and constitute a part of this disclosure. The figures are not necessarily drawn to scale.

FIG. 1 is a schematic diagram of a security system, according to some examples described herein.

FIG. 11 is a flow diagram of another subroutine or other grouping of code to process audio data, according to some examples described herein.

DETAILED DESCRIPTION

Figures 2, 3:
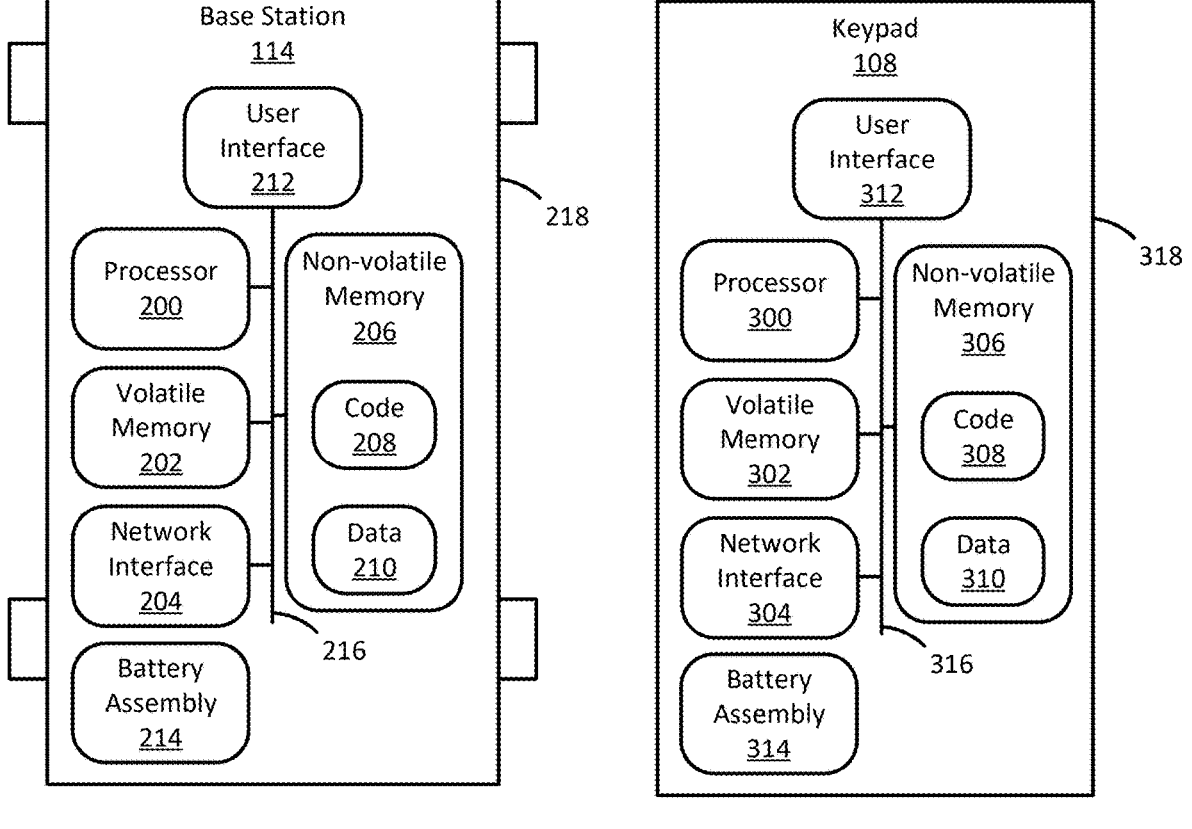
FIG. 2 is a schematic diagram of a base station, according to some examples described herein.
FIG. 3 is a schematic diagram of a keypad, according to some examples described herein.

As summarized above, at least some examples disclosed herein are directed to systems and processes for communication between devices within a distributed infrastructure (e.g., a monitoring or home security systems). Various examples relate to methods for sharing and managing data (e.g., two-way audio data) between three or more potential devices. In some cases, when two or more sets of audio data are merged, the signals formed from the combined audio data can become unintelligible, because of too much encoded information and/or noise (unknown modifications that a signal may suffer during capture, storage transmission, or processing) in the signals. In many situations, such as emergencies or security breaches, noise in a signal can disrupt important communication, such as evacuation instructions or status updates on the situation. Noise in a signal may be managed by processing (e.g., filtering) the audio shared among the devices according to various methods disclosed herein. Each device may be associated with a participant and may render the shared data via a user interface. These devices may include cameras, sensors, or other monitoring equipment. In some instances, the devices may be assigned different roles or priorities which determine how data generated by the devices is processed (e.g., filtered).

Communications may be exchanged within a virtual room, which is a service that establishes connections with a plurality of devices and enables individual devices of the plurality to exchange (e.g., send and/or receive) data in real time with one another. A virtual room thereby enables individual, connected devices to communicate with one another in real time. The data sent and received may be audio data, video data, media data (containing audio data, video data, or both) or another kind of data. In some cases, devices may have the option to control their own audio or media data by preventing it from being sent ("muting") and/or preventing data from other devices from being received ("deafening").

In some examples, the virtual room may be established by a selective forwarding unit (SFU). In some examples, the SFU is a server-based communication architecture that exposes and implements an application programming interface (API) through which other processes and establish, manage, and tear down virtual rooms. In these and other examples, the virtual room may be accessed through and/or controlled by a virtual camera. In some examples, a virtual camera is a software service that is configured to simulate a physical camera. In some examples, the virtual camera may instantiate one or more software objects, having various properties and methods, to execute operations associated with physical cameras. As such, the virtual camera may implement methods that execute image and audio processing, object detection, motion tracking, and other processes that consume substantial computational resources. Virtual cameras, which may be implemented via cloud infrastructure, can scale up computational resources to handle processing loads on the fly, whereas physical cameras may be limited to the computational and other resources (e.g., memory) provided by internal hardware. Given the nature and construction of virtual cameras, they may be configured to process audio and/or video data and communicate the processed data to the virtual room. In some instances, a virtual camera may broadcast or modify audio and/or video data sent to a virtual room; in some other instances, a virtual camera may broadcast or modify audio and/or video data collected from a virtual room. The virtual camera may process (e.g., filter, modify or otherwise adjust) the audio shared via the virtual room and may configure the virtual room to constrain behavior of devices in the room. Constraints set by the virtual camera may be different for individual devices, such that certain devices may be allowed or disallowed from sending or receiving data to or from the virtual room (and thereby to or from the other devices in the virtual room). In some cases, the virtual room may set the constraints on individual devices based on their assigned roles. In some configurations, the virtual camera may perform other operations including admitting devices to the virtual room, mixing audio data, and assigning roles to connected devices.

Devices may be assigned a role within the virtual room (e.g., via a token issued by the virtual camera, as will be described further below). In some examples, a device's role within the virtual room defines configurable aspects about that device's interaction with the room. These aspects may include permissions and priorities to modify the operation of the virtual room, the virtual camera, or the treatment of other devices connected to the virtual room. In some cases, the virtual room may be configured to only connect devices with a role to the virtual room. One role may have greater or lesser priority compared to another role or may configure a device to interact with the virtual room or other devices in a different way. Devices with greater priority may be granted more permissions to processing (e.g., filtering) operations than devices with lesser priority. Data sent to the virtual room from a device with higher priority may be emphasized to devices with lesser priority.

The virtual camera may assign roles in a number of different ways. In one example, the virtual camera may link a user account to a particular role, and when a device associated with that user account attempts to enter the virtual room, the virtual camera may assign the device the role linked with that user account. For instance, in certain examples, the virtual camera can recognize a user account with "customer" role privileges and assign both a mobile and desktop device associated with that account the customer role within the virtual room when connected. In another example, the virtual camera may link a type of device with a role within the virtual room. For instance, in some examples, the virtual camera can identify that a device attempting to connect to the virtual room is a monitoring device and assign it the "camera" role upon entrance to the virtual room. In these and other examples, the virtual camera may generate tokens which specify a role or otherwise assign a priority to a device. The virtual camera may communicate those generated tokens to the devices, before the devices connect to the virtual room, and assign roles to the devices based on the tokens, as the devices connect to the virtual room.

For example, a role may correspond to a camera, sensor, or other device (the "camera" role). The camera role may allow a connected device to broadcast audio, image, media, or other data to the virtual room so it can be viewed by the other devices in the virtual room. In some cases, a connected device with a camera role interfaces with the virtual room via the virtual camera. In those cases, other devices connected to the virtual room may, depending on their role and relative priority, control aspects of devices with the camera role by, for example, sending one or more API calls to the virtual room. Such control may include turning the device on or off, aiming or focusing the device, muting or unmuting the device, or other functions. In some cases, devices assigned to a camera role may be configured to simultaneously communicate data collected from the environment around them to the virtual room and broadcast data collected from the virtual room to the environment around them. This configuration may enable an individual near a device assigned to a camera role to communicate with other devices via the virtual room.

A role may correspond to a device operated by a user of the monitoring system (the "customer" role). The customer role may provide a device access to the virtual room in order to view the data collected by devices with the camera role. Devices with the customer role may also broadcast data, such as audio data, to the virtual room, which may be viewed by other devices in the virtual room. The customer role may also allow a connected device to control a device with the camera role, as described above. There may be multiple variations of the customer role, which may have different priorities or permissions within the virtual room. For example, there may be an administrator role which has priority over the customer roles.

Furthermore, a role may correspond to a device operated by a monitoring professional (the "agent" role), which may also view the data produced by devices with the camera role. The agent role may give a connected device priority over devices assigned customer roles in some respects. For example, the virtual room may automatically mute, or otherwise filter audio from, devices with the customer role when a device with the agent role enters the virtual room. In some examples, the agent role may have the authority to mute, unmute, deafen, or undeafen other devices with the camera or customer roles. Devices with the agent role may also communicate data, such as audio data, to the virtual room, which may be received by other devices in the virtual room.

Accordingly, in one example, a method of audio data processing is provided. The method includes sharing audio data among a camera, a mobile device and a server via access to a virtual room; identifying the server as having priority over the mobile device; transmitting audio data from the server to the camera while suppressing transmission of audio data from the mobile device to the camera; and transmitting media data from the camera to both the mobile device and the server.

These and other aspects and examples are discussed in more detail below.

Whereas various examples are described herein, it will be apparent to those of ordinary skill in the art that many more examples and implementations are possible. Accordingly, the examples described herein are not the only possible examples and implementations. Furthermore, the advantages described above are not necessarily the only advantages, and it is not necessarily expected that all of the described advantages will be achieved with every example.

For the purposes of promoting an understanding of the principles of the present disclosure, reference will now be made to the examples illustrated in the drawings, and specific language will be used to describe the same. It will nevertheless be understood that no limitation of the scope of the examples described herein is thereby intended.

Figure 1:
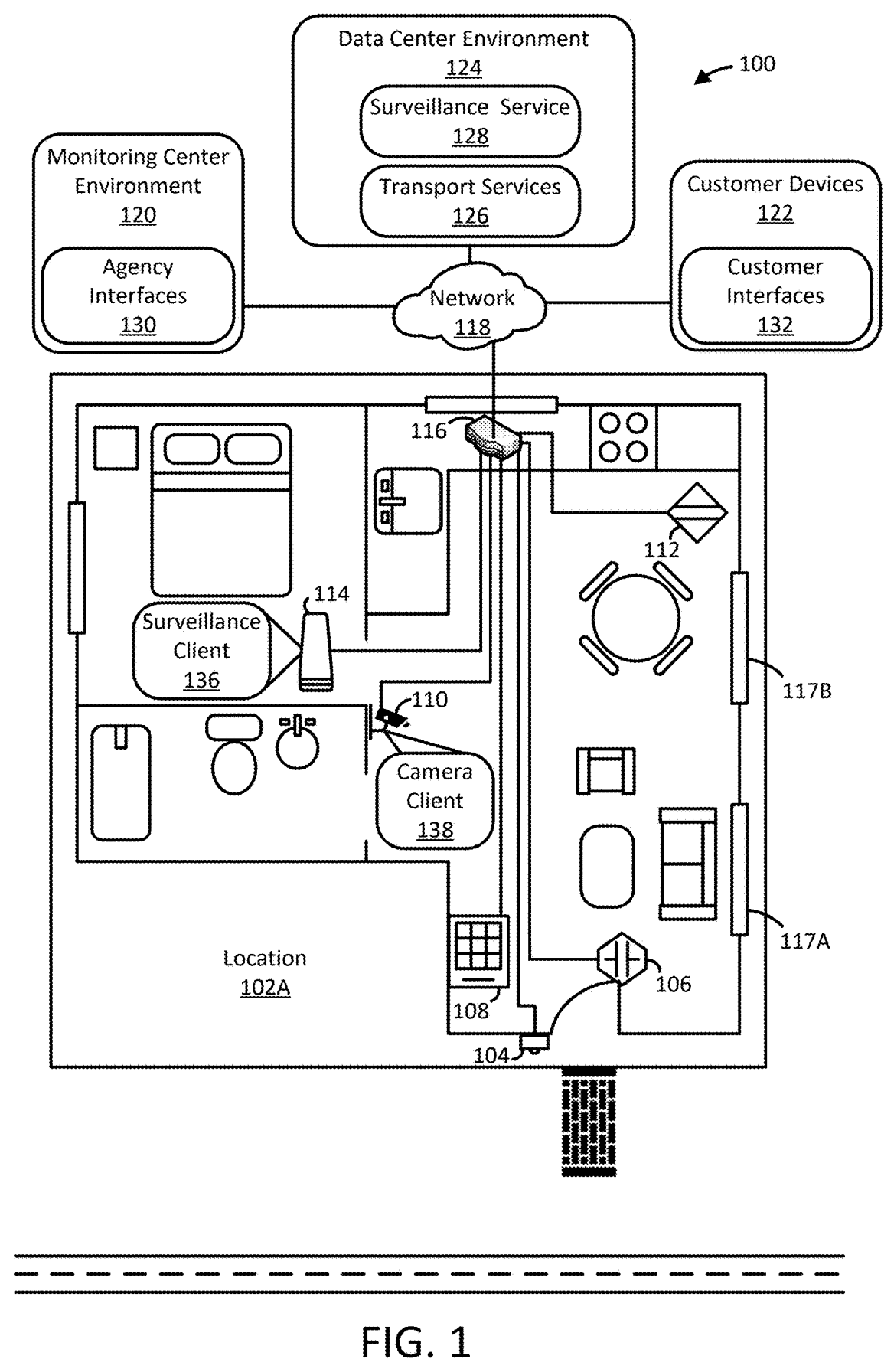

FIG. 1 is a schematic diagram of a security system 100 configured to monitor geographically disparate locations in accordance with some examples. As shown in FIG. 1, the system 100 includes a monitored location 102A, a monitoring center environment 120, a data center environment 124, one or more customer devices 122, and a communication network 118. Each of the monitored location 102A, the monitoring center environment 120, the data center environment 124, the one or more customer devices 122, and the communication network 118 include one or more computing devices (e.g., as described below with reference to FIG. 12). The one or more customer devices 122 are configured to host one or more customer interface applications 132. The monitoring center environment 120 is configured to host one or more agency interface applications 130. The data center environment 124 is configured to host a surveillance service 128 and one or more transport services 126. The location 102A includes image capture devices 104 and 110, a contact sensor assembly 106, a keypad 108, a motion sensor assembly 112, a base station 114, and a router 116. The base station 114 hosts a surveillance client 136. The image capture device 110 hosts a camera client 138. The security devices disposed at the location 102A (e.g., devices 104, 106, 108, 110, 112, and 114) may be referred to herein as location-based devices.

In some examples, the router 116 is a wireless router that is configured to communicate with the location-based devices via communications that comport with a communications standard such as any of the various Institute of Electrical and Electronics Engineers (IEEE) 802.11 standards. As illustrated in FIG. 1, the router 116 is also configured to communicate with the network 118. It should be noted that the router 116 implements a local area network (LAN) within and proximate to the location 102A by way of example only. Other networking technology that involves other computing devices is suitable for use within the location 102A. For instance, in some examples, the base station 114 can receive and forward communication packets transmitted by the image capture device 110 via a personal area network (PAN) protocol, such as BLUETOOTH. Additionally or alternatively, in some examples, the location-based devices communicate directly with one another using any of a variety of standards suitable for point-to-point use, such as any of the IEEE 802.11 standards, PAN standards, etc. In at least one example, the location-based devices can communicate with one another using a sub-GHz wireless networking standard, such as IEEE 802.11ah, Z-WAVE, ZIGBEE, etc. Other wired, wireless, and mesh network technology and topologies will be apparent with the benefit of this disclosure and are intended to fall within the scope of the examples disclosed herein.

Continuing with the example of FIG. 1, the network 118 can include one or more public and/or private networks that support, for example, IP. The network 118 may include, for example, one or more LANs, one or more PANs, and/or one or more wide area networks (WANs). The LANs can include wired or wireless networks that support various LAN standards, such as a version of IEEE 802.11 and the like. The PANs can include wired or wireless networks that support various PAN standards, such as BLUETOOTH, ZIGBEE, and the like. The WANs can include wired or wireless networks that support various WAN standards, such as the Code Division Multiple Access (CDMA) radio standard, the Global System for Mobiles (GSM) radio standard, and the like. The network 118 connects and enables data communication between the computing devices within the location 102A, the monitoring center environment 120, the data center environment 124, and the customer devices 122. In at least some examples, both the monitoring center environment 120 and the data center environment 124 include network equipment (e.g., similar to the router 116) that is configured to communicate with the network 118 and computing devices collocated with or near the network equipment. It should be noted that, in some examples, the network 118 and the network extant within the location 102A support other communication protocols, such as MQTT or other IoT protocols.

Continuing with the example of FIG. 1, the data center environment 124 can include physical space, communications, cooling, and power infrastructure to support networked operation of computing devices. For instance, this infrastructure can include rack space into which the computing devices are installed, uninterruptible power supplies, cooling plenum and equipment, and networking devices. The data center environment 124 can be dedicated to the security system 100, can be a non-dedicated, commercially available cloud computing service (e.g., MICROSOFT AZURE, AMAZON WEB SERVICES, GOOGLE CLOUD, or the like), or can include a hybrid configuration made up of dedicated and non-dedicated resources. Regardless of its physical or logical configuration, as shown in FIG. 1, the data center environment 124 is configured to host the surveillance service 128 and the transport services 126.

Continuing with the example of FIG. 1, the monitoring center environment 120 can include a plurality of computing devices (e.g., desktop computers) and network equipment (e.g., one or more routers) connected to the computing devices and the network 118. The customer devices 122 can include personal computing devices (e.g., a desktop computer, laptop, tablet, smartphone, or the like) and network equipment (e.g., a router, cellular modem, cellular radio, or the like). As illustrated in FIG. 1, the monitoring center environment 120 is configured to host the agency interfaces 130 and the customer devices 122 are configured to host the customer interfaces 132.

Continuing with the example of FIG. 1, the devices 104, 106, 110, and 112 are configured to acquire analog signals via sensors incorporated into the devices, generate digital sensor data based on the acquired signals, and communicate (e.g., via a wireless link with the router 116) the sensor data to the base station 114. The type of sensor data generated and communicated by these devices varies along with the type of sensors included in the devices. For instance, the image capture devices 104 and 110 can acquire ambient light, generate frames of image data based on the acquired light, and communicate the frames to the base station 114, the agency interfaces 130, and/or the customer interfaces 132, although the pixel resolution and frame rate may vary depending on the capabilities of the devices. Where the image capture devices 104 and 110 have sufficient processing capacity and available power, the image capture devices 104 and 110 can process the image frames and transmit messages based on content depicted in the image frames, as described further below. These messages may specify reportable events and may be transmitted in place of, or in addition to, the image frames. Such messages may be sent directly to another location-based device (e.g., via sub-GHz networking) and/or indirectly to any device within the system 100 (e.g., via the router 116). As shown in FIG. 1, the image capture device 104 has a field of view (FOV) that originates proximal to a front door of the location 102A and can acquire images of a walkway, highway, and a space between the location 102A and the highway. The image capture device 110 has an FOV that originates proximal to a bathroom of the location 102A and can acquire images of a living room and dining area of the location 102A. The image capture device 110 can further acquire images of outdoor areas beyond the location 102A through windows 117A and 117B on the right side of the location 102A.

Further, as shown in FIG. 1, in some examples the image capture device 110 is configured to communicate with the surveillance service 128, the agency interfaces 130, and the customer interfaces 132 separately from the surveillance client 136 via execution of the camera client 138. These communications can include sensor data generated by the image capture device 110 and/or commands to be executed by the image capture device 110 sent by the surveillance service 128, the agency interfaces 130, and/or the customer interfaces 132. The commands can include, for example, requests for interactive communication sessions in which monitoring personnel and/or customers interact with the image capture device 110 via the agency interfaces 130 and the customer interfaces 132. These interactions can include requests for the image capture device 110 to transmit additional sensor data and/or requests for the image capture device 110 to render output via a user interface (e.g., the user interface 412 of FIGS. 4B and 4C). This output can include audio and/or video output.

Continuing with the example of FIG. 1, the contact sensor assembly 106 includes a sensor that can detect the presence or absence of a magnetic field generated by a magnet when the magnet is proximal to the sensor. When the magnetic field is present, the contact sensor assembly 106 generates Boolean sensor data specifying a closed state. When the magnetic field is absent, the contact sensor assembly 106 generates Boolean sensor data specifying an open state. In either case, the contact sensor assembly 106 can communicate sensor data indicating whether the front door of the location 102A is open or closed to the base station 114. The motion sensor assembly 112 can include an audio emission device that can radiate sound (e.g., ultrasonic) waves and an audio sensor that can acquire reflections of the waves. When the audio sensor detects the reflection because no objects are in motion within the space monitored by the audio sensor, the motion sensor assembly 112 generates Boolean sensor data specifying a still state. When the audio sensor does not detect a reflection because an object is in motion within the monitored space, the motion sensor assembly 112 generates Boolean sensor data specifying an alarm state. In either case, the motion sensor assembly 112 can communicate the sensor data to the base station 114. It should be noted that the specific sensing modalities described above are not limiting to the present disclosure. For instance, as one of many potential examples, the motion sensor assembly 112 can base its operation on acquisition of changes in temperature rather than changes in reflected sound waves.

Continuing with the example of FIG. 1, the keypad 108 is configured to interact with a user and interoperate with the other location-based devices in response to interactions with the user. For instance, in some examples, the keypad 108 is configured to receive input from a user that specifies one or more commands and to communicate the specified commands to one or more addressed processes. These addressed processes can include processes implemented by one or more of the location-based devices and/or one or more of the agency interfaces 130 or the surveillance service 128. The commands can include, for example, codes that authenticate the user as a resident of the location 102A and/or codes that request activation or deactivation of one or more of the location-based devices. Alternatively or additionally, in some examples, the keypad 108 includes a user interface (e.g., a tactile interface, such as a set of physical buttons or a set of virtual buttons on a touchscreen) configured to interact with a user (e.g., receive input from and/or render output to the user). Further still, in some examples, the keypad 108 can receive and respond to the communicated commands and render the responses via the user interface as visual or audio output.

Continuing with the example of FIG. 1, the base station 114 is configured to interoperate with the other location-based devices to provide local command and control and store-and-forward functionality via execution of the surveillance client 136. In some examples, to implement store-and-forward functionality, the base station 114, through execution of the surveillance client 136, receives sensor data, packages the data for transport, and stores the packaged sensor data in local memory for subsequent communication. This communication of the packaged sensor data can include, for instance, transmission of the packaged sensor data as a payload of a message to one or more of the transport services 126 when a communication link to the transport services 126 via the network 118 is operational. In some examples, packaging the sensor data can include filtering the sensor data and/or generating one or more summaries (maximum values, minimum values, average values, changes in values since the previous communication of the same, etc.) of multiple sensor readings. To implement local command and control functionality, the base station 114 executes, under control of the surveillance client 136, a variety of programmatic operations in response to various events. Examples of these events can include reception of commands from the keypad 108 or the customer interface application 132, reception of commands from one of the agency interfaces 130 or the customer interface application 132 via the network 118, or detection of the occurrence of a scheduled event. The programmatic operations executed by the base station 114 under control of the surveillance client 136 can include activation or deactivation of one or more of the devices 104, 106, 108, 110, and 112; sounding of an alarm; reporting an event to the surveillance service 128; and communicating location data to one or more of the transport services 126 to name a few operations. The location data can include data specifying sensor readings (sensor data), configuration data of any of the location-based devices, commands received from a user (e.g., via the keypad 108 or a customer interface 132), or data derived from one or more of these data types (e.g., filtered sensor data, summarizations of sensor data, event data specifying an event detected at the location via the sensor data, etc.).

Continuing with the example of FIG. 1, the transport services 126 are configured to securely, reliably, and efficiently exchange messages between processes implemented by the location-based devices and processes implemented by other devices in the system 100. These other devices can include the customer devices 122, devices disposed in the data center environment 124, and/or devices disposed in the monitoring center environment 120. In some examples, the transport services 126 are also configured to parse messages from the location-based devices to extract payloads included therein and store the payloads and/or data derived from the payloads within one or more data stores hosted in the data center environment 124. The data housed in these data stores may be subsequently accessed by, for example, the surveillance service 128, the agency interfaces 130, and the customer interfaces 132. It should be noted that data stored within any of the data stores disclosed herein may be stored by value or by reference (e.g., via an pointer, address, or other identifier of the data or the data's location).

In certain examples, the transport services 126 expose and implement one or more application programming interfaces (APIs) that are configured to receive, process, and respond to calls from processes (e.g., the surveillance client 136) implemented by base stations (e.g., the base station 114) and/or processes (e.g., the camera client 138) implemented by other devices (e.g., the image capture device 110). Individual instances of a transport service within the transport services 126 can be associated with and specific to certain manufactures and models of location-based monitoring equipment (e.g., SIMPLISAFE equipment, RING equipment, etc.). The APIs can be implemented using a variety of architectural styles and interoperability standards. For instance, in one example, the API is a web services interface implemented using a representational state transfer (REST) architectural style. In this example, API calls are encoded in Hypertext Transfer Protocol (HTTP) along with JavaScript Object Notation (JSON) and/or extensible markup language (XML). These API calls are addressed to one or more uniform resource locators (URLs) that are API endpoints monitored by the transport services 126. In some examples, portions of the HTTP communications are encrypted to increase security. Alternatively or additionally, in some examples, the API is implemented as an MQTT broker that receives messages and transmits responsive messages to MQTT clients hosted by the base stations and/or the other devices. Alternatively or additionally, in some examples, the API is implemented using simple file transfer protocol commands. Thus, the transport services 126 are not limited to a particular protocol or architectural style. It should be noted that, in at least some examples, the transport services 126 can transmit one or more API calls to location-based devices to request data from, or an interactive communication session with, the location-based devices.

Continuing with the example of FIG. 1, the surveillance service 128 is configured to control overall logical setup and operation of the system 100. As such, the surveillance service 128 can interoperate with the transport services 126, the agency interfaces 130, the customer interfaces 132, and any of the location-based devices. In some examples, the surveillance service 128 is configured to monitor data from a variety of sources for reportable events (e.g., a break-in event) and, when a reportable event is detected, notify one or more of the agency interfaces 130 and/or the customer interfaces 132 of the reportable event. In some examples, the surveillance service 128 is also configured to maintain state information regarding the location 102A. This state information can indicate, for instance, whether the location 102A is safe or under threat. In certain examples, the surveillance service 128 is configured to change the state information to indicate that the location 102A is safe only upon receipt of a communication indicating a clear event (e.g., rather than making such a change in response to discontinuation of reception of break-in events). This feature can prevent a "crash and smash" robbery from being successfully executed. Further example processes that the surveillance service 128 is configured to execute are described below with reference to FIGS. 5 and 6.

Continuing with the example of FIG. 1, individual agency interfaces 130 are configured to control computing device interaction with monitoring personnel and to execute a variety of programmatic operations in response to the interactions. For instance, in some examples, the agency interface 130 controls its host device to provide information regarding reportable events detected at monitored locations, such as the location 102A, to monitoring personnel. Such events can include, for example, movement or an alarm condition generated by one or more of the location-based devices. Alternatively or additionally, in some examples, the agency interface 130 controls its host device to interact with a user to configure features of the system 100. Further example processes that the agency interface 130 is configured to execute are described below with reference to FIG. 6. It should be noted that, in at least some examples, the agency interfaces 130 are browser-based applications served to the monitoring center environment 120 by webservers included within the data center environment 124. These webservers may be part of the surveillance service 128, in certain examples.

Continuing with the example of FIG. 1, individual customer interfaces 132 are configured to control computing device interaction with a customer and to execute a variety of programmatic operations in response to the interactions. For instance, in some examples, the customer interface 132 controls its host device to provide information regarding reportable events detected at monitored locations, such as the location 102A, to the customer. Such events can include, for example, an alarm condition generated by one or more of the location-based devices. Alternatively or additionally, in some examples, the customer interface 132 is configured to process input received from the customer to activate or deactivate one or more of the location-based devices. Further still, in some examples, the customer interface 132 configures features of the system 100 in response to input from a user. Further example processes that the customer interface 132 is configured to execute are described below with reference to FIG. 6.

Turning now to FIG. 2, an example base station 114 is schematically illustrated. As shown in FIG. 2, the base station 114 includes at least one processor 200, volatile memory 202, non-volatile memory 206, at least one network interface 204, a user interface 212, a battery assembly 214, and an interconnection mechanism 216. The non-volatile memory 206 stores executable code 208 and includes a data store 210. In some examples illustrated by FIG. 2, the features of the base station 114 enumerated above are incorporated within, or are a part of, a housing 218.

In some examples, the non-volatile (non-transitory) memory 206 includes one or more read-only memory (ROM) chips; one or more hard disk drives or other magnetic or optical storage media; one or more solid state drives (SSDs), such as a flash drive or other solid-state storage media; and/or one or more hybrid magnetic and SSDs. In certain examples, the code 208 stored in the non-volatile memory can include an operating system and one or more applications or programs that are configured to execute under the operating system. Alternatively or additionally, the code 208 can include specialized firmware and embedded software that is executable without dependence upon a commercially available operating system. Regardless, execution of the code 208 can implement the surveillance client 136 of FIG. 1 and can result in manipulated data that is a part of the data store 210.

Continuing with the example of FIG. 2, the processor 200 can include one or more programmable processors to execute one or more executable instructions, such as a computer program specified by the code 208, to control the operations of the base station 114. As used herein, the term "processor" describes circuitry that executes a function, an operation, or a sequence of operations. The function, operation, or sequence of operations can be hard coded into the circuitry or soft coded by way of instructions held in a memory device (e.g., the volatile memory 202) and executed by the circuitry. In some examples, the processor 200 is a digital processor, but the processor 200 can be analog, digital, or mixed. As such, the processor 200 can execute the function, operation, or sequence of operations using digital values and/or using analog signals. In some examples, the processor 200 can be embodied in one or more application specific integrated circuits (ASICs), microprocessors, digital signal processors (DSPs), graphics processing units (GPUs), neural processing units (NPUs), microcontrollers, field programmable gate arrays (FPGAs), programmable logic arrays (PLAs), or multicore processors. Examples of the processor 200 that are multicore can provide functionality for parallel, simultaneous execution of instructions or for parallel, simultaneous execution of one instruction on more than one piece of data.

Continuing with the example of FIG. 2, prior to execution of the code 208 the processor 200 can copy the code 208 from the non-volatile memory 206 to the volatile memory 202. In some examples, the volatile memory 202 includes one or more static or dynamic random access memory (RAM) chips and/or cache memory (e.g., memory disposed on a silicon die of the processor 200). Volatile memory 202 can offer a faster response time than a main memory, such as the non-volatile memory 206.

Through execution of the code 208, the processor 200 can control operation of the network interface 204. For instance, in some examples, the network interface 204 includes one or more physical interfaces (e.g., a radio, an ethernet port, a universal serial bus (USB) port, etc.) and a software stack including drivers and/or other code 208 that is configured to communicate with the one or more physical interfaces to support one or more LAN, PAN, and/or WAN standard communication protocols. The communication protocols can include, for example, transmission control protocol/internet protocol (TCP/IP), user datagram protocol (UDP), HTTP, and MQTT among others. As such, the network interface 204 enables the base station 114 to access and communicate with other computing devices (e.g., the location-based devices) via a computer network (e.g., the LAN established by the router 116 of FIG. 1, the network 118 of FIG. 1, and/or a point-to-point connection). For instance, in at least one example, the network interface 204 utilizes sub-GHz wireless networking to transmit messages to other location-based devices. These messages can include wake messages to request streams of sensor data, alarm messages to trigger alarm responses, or other messages to initiate other operations. Bands that the network interface 204 may utilize for sub-GHz wireless networking include, for example, an 868 MHz band and/or a 915 MHz band. Use of sub-GHz wireless networking can improve operable communication distances and/or reduce power consumed to communicate.

Through execution of the code 208, the processor 200 can control operation of the user interface 212. For instance, in some examples, the user interface 212 includes user input and/or output devices (e.g., a keyboard, a mouse, a touchscreen, a display, a speaker, a camera, an accelerometer, a biometric scanner, an environmental sensor, etc.) and a software stack including drivers and/or other code 208 that is configured to communicate with the user input and/or output devices. For instance, the user interface 212 can be implemented by a customer device 122 hosting a mobile application (e.g., a customer interface 132). The user interface 212 enables the base station 114 to interact with users to receive input and/or render output. This rendered output can include, for instance, one or more graphical user interfaces (GUIs) including one or more controls configured to display output and/or receive input. The input can specify values to be stored in the data store 210. The output can indicate values stored in the data store 210. It should be noted that, in some examples, parts of the user interface 212 are accessible and/or visible as part of, or through, the housing 218. These parts of the user interface 212 can include, for example, one or more light-emitting diodes (LEDs). Alternatively or additionally, in some examples, the user interface 212 includes a 95 dB siren that the processor 200 sounds to indicate that a break-in event has been detected.

Continuing with the example of FIG. 2, the various features of the base station 114 described above can communicate with one another via the interconnection mechanism 216. In some examples, the interconnection mechanism 216 includes a communications bus. In addition, in some examples, the battery assembly 214 is configured to supply operational power to the various features of the base station 114 described above. In some examples, the battery assembly 214 includes at least one rechargeable battery (e.g., one or more NiMH or lithium batteries). In some examples, the rechargeable battery has a runtime capacity sufficient to operate the base station 114 for 24 hours or longer while the base station 114 is disconnected from or otherwise not receiving line power. Alternatively or additionally, in some examples, the battery assembly 214 includes power supply circuitry to receive, condition, and distribute line power to both operate the base station 114 and recharge the rechargeable battery. The power supply circuitry can include, for example, a transformer and a rectifier, among other circuitry, to convert AC line power to DC device and recharging power.

Turning now to FIG. 3, an example keypad 108 is schematically illustrated. As shown in FIG. 3, the keypad 108 includes at least one processor 300, volatile memory 302, non-volatile memory 306, at least one network interface 304, a user interface 312, a battery assembly 314, and an interconnection mechanism 316. The non-volatile memory 306 stores executable code 308 and a data store 310. In some examples illustrated by FIG. 3, the features of the keypad 108 enumerated above are incorporated within, or are a part of, a housing 318.

In some examples, the respective descriptions of the processor 200, the volatile memory 202, the non-volatile memory 206, the interconnection mechanism 216, and the battery assembly 214 with reference to the base station 114 are applicable to the processor 300, the volatile memory 302, the non-volatile memory 306, the interconnection mechanism 316, and the battery assembly 314 with reference to the keypad 108. As such, those descriptions will not be repeated.

Continuing with the example of FIG. 3, through execution of the code 308, the processor 300 can control operation of the network interface 304. In some examples, the network interface 304 includes one or more physical interfaces (e.g., a radio, an ethernet port, a USB port, etc.) and a software stack including drivers and/or other code 308 that is configured to communicate with the one or more physical interfaces to support one or more LAN, PAN, and/or WAN standard communication protocols. These communication protocols can include, for example, TCP/IP, UDP, HTTP, and MQTT among others. As such, the network interface 304 enables the keypad 108 to access and communicate with other computing devices (e.g., the other location-based devices) via a computer network (e.g., the LAN established by the router 116 and/or a point-to-point connection).

Continuing with the example of FIG. 3, through execution of the code 308, the processor 300 can control operation of the user interface 312. In some examples, the user interface 312 includes user input and/or output devices (e.g., physical keys arranged as a keypad, a touchscreen, a display, a speaker, a camera, a biometric scanner, an environmental sensor, etc.) and a software stack including drivers and/or other code 308 that is configured to communicate with the user input and/or output devices. As such, the user interface 312 enables the keypad 108 to interact with users to receive input and/or render output. This rendered output can include, for instance, one or more GUIs including one or more controls configured to display output and/or receive input. The input can specify values to be stored in the data store 310. The output can indicate values stored in the data store 310. It should be noted that, in some examples, parts of the user interface 312 (e.g., one or more LEDs) are accessible and/or visible as part of, or through, the housing 318.

In some examples, devices like the keypad 108, which rely on user input to trigger an alarm condition, may be included within a security system, such as the security system 100 of FIG. 1. Examples of such devices include dedicated key fobs and panic buttons. These dedicated security devices provide a user with a simple, direct way to trigger an alarm condition, which can be particularly helpful in times of duress.

Figure 4A:
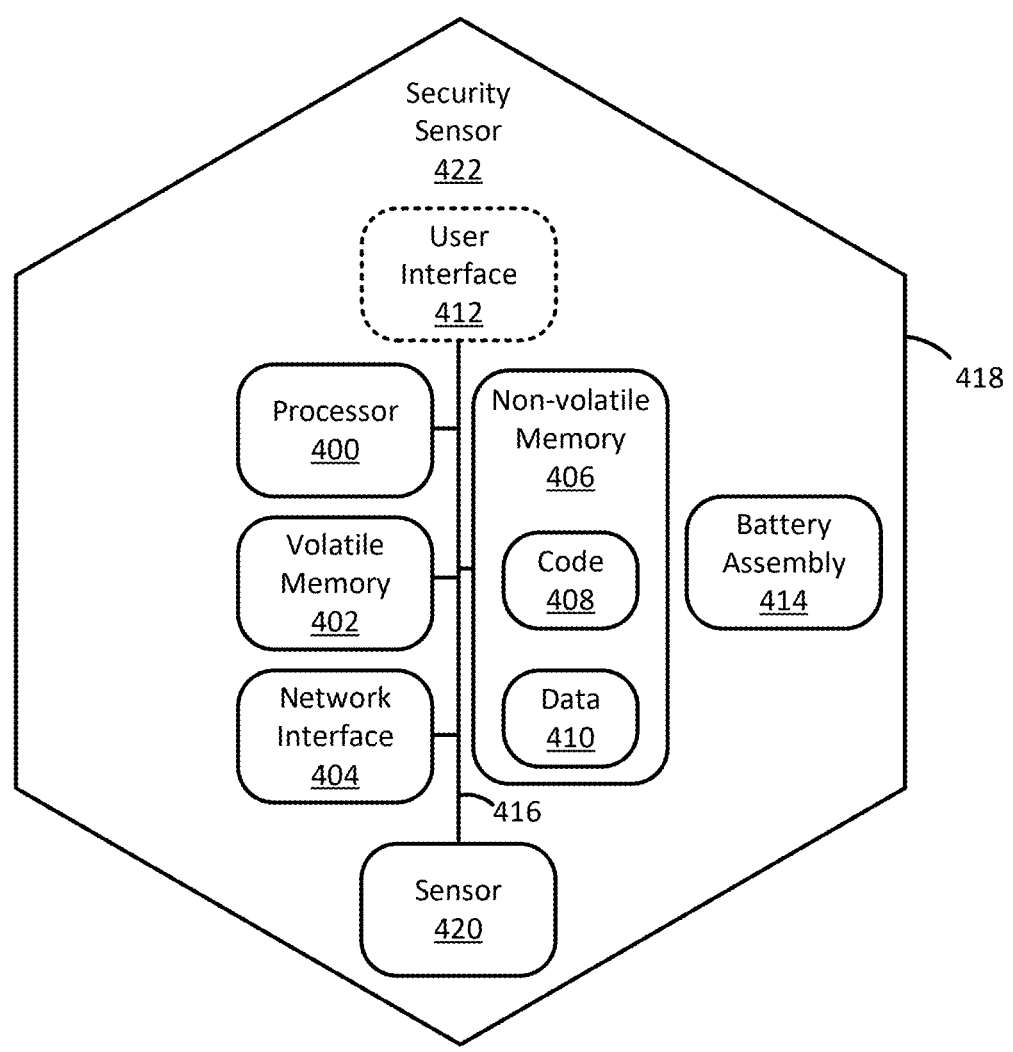
FIG. 4A is a schematic diagram of a security sensor, according to some examples described herein.

Turning now to FIG. 4A, an example security sensor 422 is schematically illustrated. Particular configurations of the security sensor 422 (e.g., the image capture devices 104 and 110, the motion sensor assembly 112, and the contact sensor assemblies 106) are illustrated in FIG. 1 and described above. Other examples of security sensors 422 include glass break sensors, carbon monoxide sensors, smoke detectors, water sensors, temperature sensors, and door lock sensors, to name a few. As shown in FIG. 4A, the security sensor 422 includes at least one processor 400, volatile memory 402, non-volatile memory 406, at least one network interface 404, a battery assembly 414, an interconnection mechanism 416, and at least one sensor assembly 420. The non-volatile memory 406 stores executable code 408 and a data store 410. Some examples include a user interface 412. As indicated by its rendering in dashed lines, not all examples of the security sensor 422 include the user interface 412. In certain examples illustrated by FIG. 4A, the features of the security sensor 422 enumerated above are incorporated within, or are a part of, a housing 418.

In some examples, the respective descriptions of the processor 200, the volatile memory 202, the non-volatile memory 206, the interconnection mechanism 216, and the battery assembly 214 with reference to the base station 114 are applicable to the processor 400, the volatile memory 402, the non-volatile memory 406, the interconnection mechanism 416, and the battery assembly 414 with reference to the security sensor 422. As such, those descriptions will not be repeated.

Continuing with the example of FIG. 4A, through execution of the code 408, the processor 400 can control operation of the network interface 404. In some examples, the network interface 404 includes one or more physical interfaces (e.g., a radio (including an antenna), an ethernet port, a USB port, etc.) and a software stack including drivers and/or other code 408 that is configured to communicate with the one or more physical interfaces to support one or more LAN, PAN, and/or WAN standard communication protocols. The communication protocols can include, for example, TCP/IP, UDP, HTTP, and MQTT among others. As such, the network interface 404 enables the security sensor 422 to access and communicate with other computing devices (e.g., the other location-based devices) via a computer network (e.g., the LAN established by the router 116 and/or a point-to-point connection). For instance, in at least one example, when executing the code 408, the processor 400 controls the network interface to stream (e.g., via UDP) sensor data acquired from the sensor assembly 420 to the base station 114. Alternatively or additionally, in at least one example, through execution of the code 408, the processor 400 can control the network interface 404 to enter a power conservation mode by powering down a 2.4 GHz radio and powering up a sub-GHz radio that are both included in the network interface 404. In this example, through execution of the code 408, the processor 400 can control the network interface 404 to enter a streaming or interactive mode by powering up a 2.4 GHz radio and powering down a sub-GHz radio, for example, in response to receiving a wake signal from the base station via the sub-GHz radio.

Continuing with the example of FIG. 4A, through execution of the code 408, the processor 400 can control operation of the user interface 412. In some examples, the user interface 412 includes user input and/or output devices (e.g., physical buttons, a touchscreen, a display, a speaker, a camera, an accelerometer, a biometric scanner, an environmental sensor, one or more LEDs, etc.) and a software stack including drivers and/or other code 408 that is configured to communicate with the user input and/or output devices. As such, the user interface 412 enables the security sensor 422 to interact with users to receive input and/or render output. This rendered output can include, for instance, one or more GUIs including one or more controls configured to display output and/or receive input. The input can specify values to be stored in the data store 410. The output can indicate values stored in the data store 410. It should be noted that, in some examples, parts of the user interface 412 are accessible and/or visible as part of, or through, the housing 418.

Continuing with the example of FIG. 4A, the sensor assembly 420 can include one or more types of sensors, such as the sensors described above with reference to the image capture devices 104 and 110, the motion sensor assembly 112, and the contact sensor assembly 106 of FIG. 1, or other types of sensors. For instance, in at least one example, the sensor assembly 420 includes an image sensor (e.g., a charge-coupled device or an active-pixel sensor) and/or a temperature or thermographic sensor (e.g., an active and/or passive infrared (PIR) sensor). Regardless of the type of sensor or sensors housed, the processor 400 can (e.g., via execution of the code 408) acquire sensor data from the housed sensor and stream the acquired sensor data to the processor 400 for communication to the base station.

It should be noted that, in some examples of the devices 108 and 422, the operations executed by the processors 300 and 400 while under control of respective control of the code 308 and 408 may be hardcoded and/or implemented in hardware, rather than as a combination of hardware and software. Moreover, execution of the code 408 can implement the camera client 138 of FIG. 1 and can result in manipulated data that is a part of the data store 410.

Figure 4B:
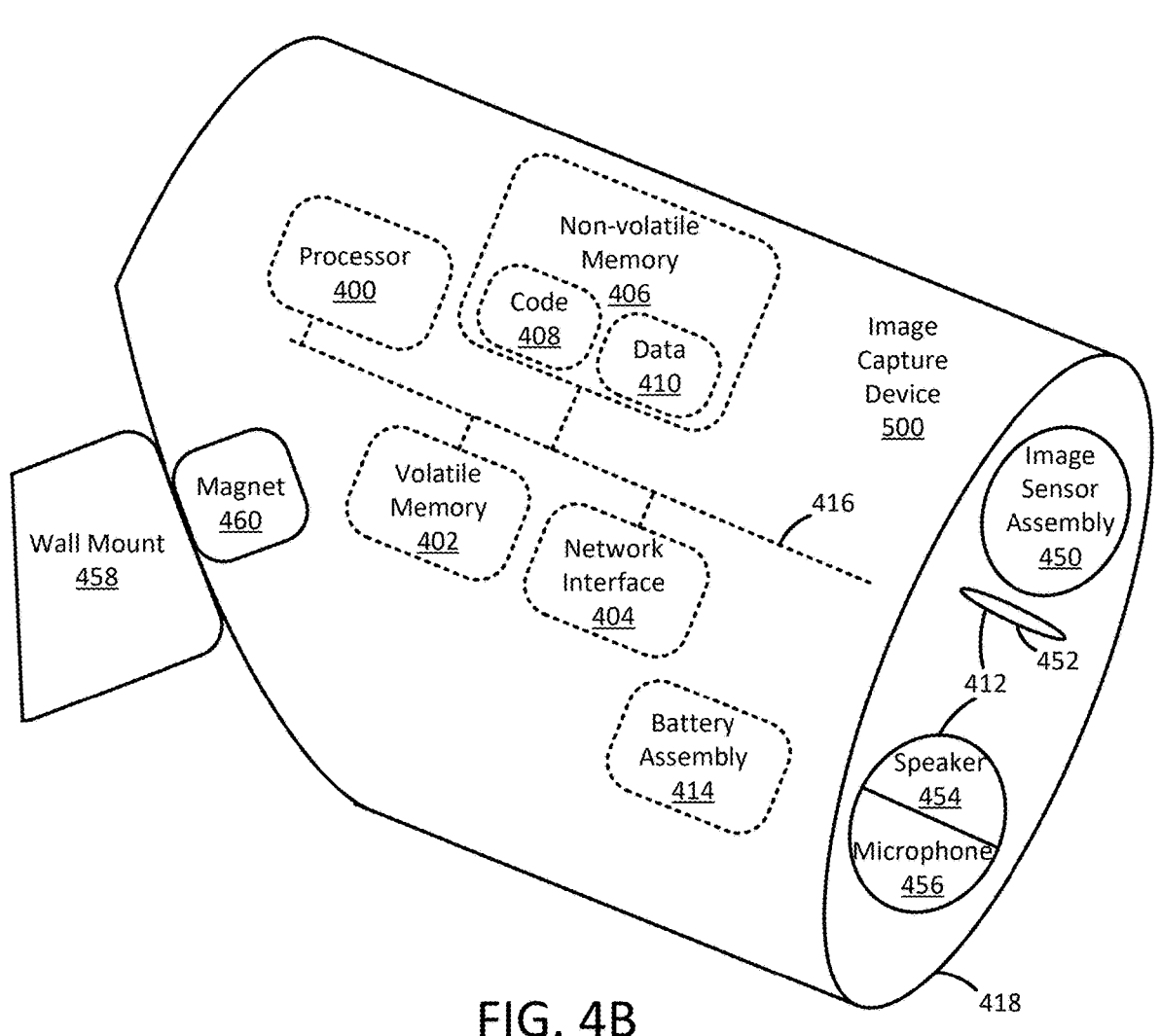
FIG. 4B is a schematic diagram of an image capture device, according to some examples described herein.

Turning now to FIG. 4B, an example image capture device 500 is schematically illustrated. Particular configurations of the image capture device 500 (e.g., the image capture devices 104 and 110) are illustrated in FIG. 1 and described above. As shown in FIG. 4B, the image capture device 500 includes at least one processor 400, volatile memory 402, non-volatile memory 406, at least one network interface 404, a battery assembly 414, and an interconnection mechanism 416. These features of the image capture device 500 are illustrated in dashed lines to indicate that they reside within a housing 418. The non-volatile memory 406 stores executable code 408 and a data store 410.

Some examples further include an image sensor assembly 450, a light 452, a speaker 454, a microphone 456, a wall mount 458, and a magnet 460. The image sensor assembly 450 may include a lens and an image sensor (e.g., a charge-coupled device or an active-pixel sensor) and/or a temperature or thermographic sensor (e.g., an active and/or passive infrared (PIR) sensor). The light 452 may include a light emitting diode (LED), such as a red-green-blue emitting LED. The light 452 may also include an infrared emitting diode in some examples. The speaker 454 may include a transducer configured to emit sound in the range of 60 dB to 80 dB or louder. Further, in some examples, the speaker 454 can include a siren configured to emit sound in the range of 70 dB to 90 dB or louder. The microphone 456 may include a micro electro-mechanical system (MEMS) microphone. The wall mount 458 may include a mounting bracket, configured to accept screws or other fasteners that adhere the bracket to a wall, and a cover configured to mechanically couple to the mounting bracket. In some examples, the cover is composed of a magnetic material, such as aluminum or stainless steel, to enable the magnet 460 to magnetically couple to the wall mount 458, thereby holding the image capture device 500 in place.

In some examples, the respective descriptions of the processor 400, the volatile memory 402, the network interface 404, the non-volatile memory 406, the code 408 with respect to the network interface 404, the interconnection mechanism 416, and the battery assembly 414 with reference to the security sensor 422 are applicable to these same features with reference to the image capture device 500. As such, those descriptions will not be repeated here.

Continuing with the example of FIG. 4B, through execution of the code 408, the processor 400 can control operation of the image sensor assembly 450, the light 452, the speaker 454, and the microphone 456. For instance, in at least one example, when executing the code 408, the processor 400 controls the image sensor assembly 450 to acquire sensor data, in the form of image data, to be streamed to the base station 114 (or one of the processes 130, 128, or 132 of FIG. 1) via the network interface 404. Alternatively or additionally, in at least one example, through execution of the code 408, the processor 400 controls the light 452 to emit light so that the image sensor assembly 450 collects sufficient reflected light to compose the image data. Further, in some examples, through execution of the code 408, the processor 400 controls the speaker 454 to emit sound. This sound may be locally generated (e.g., a sonic alarm via the siren) or streamed from the base station 114 (or one of the processes 130, 128, or 132 of FIG. 1) via the network interface 404 (e.g., utterances from the user or monitoring personnel). Further still, in some examples, through execution of the code 408, the processor 400 controls the microphone 456 to acquire sensor data in the form of sound for streaming to the base station 114 (or one of the processes 130, 128, or 132 of FIG. 1) via the network interface 404.

It should be appreciated that in the example of FIG. 4B, the light 452, the speaker 454, and the microphone 456 implement an instance of the user interface 412 of FIG. 4A. It should also be appreciated that the image sensor assembly 450 and the light 452 implement an instance of the sensor assembly 420 of FIG. 4A. As such, the image capture device 500 illustrated in FIG. 4B is at least one example of the security sensor 422 illustrated in FIG. 4A. The image capture device 500 may be a battery-powered outdoor sensor configured to be installed and operated in an outdoor environment, such as outside a home, office, store, or other commercial or residential building, for example.

Figure 4C:
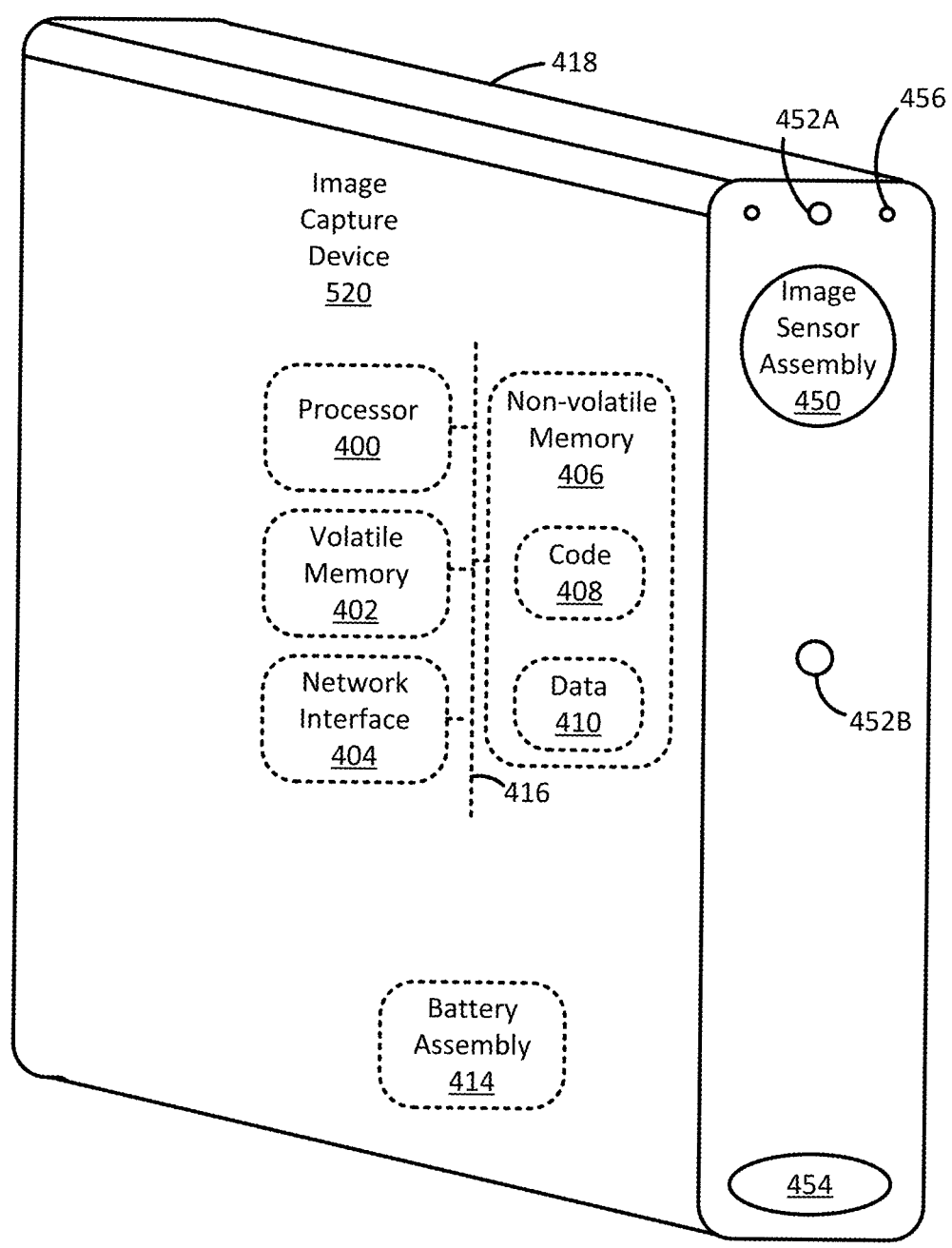
FIG. 4C is a schematic diagram of another image capture device, according to some examples described herein.

Turning now to FIG. 4C, another example image capture device 520 is schematically illustrated. Particular configurations of the image capture device 520 (e.g., the image capture devices 104 and 110) are illustrated in FIG. 1 and described above. As shown in FIG. 4C, the image capture device 520 includes at least one processor 400, volatile memory 402, non-volatile memory 406, at least one network interface 404, a battery assembly 414, and an interconnection mechanism 416. These features of the image capture device 520 are illustrated in dashed lines to indicate that they reside within a housing 418. The non-volatile memory 406 stores executable code 408 and a data store 410. The image capture device 520 further includes an image sensor assembly 450, a speaker 454, and a microphone 456 as described above with reference to the image capture device 500 of FIG. 4B.

In some examples, the image capture device 520 further includes lights 452A and 452B. The light 452A may include a light emitting diode (LED), such as a red-green-blue emitting LED. The light 452B may also include an infrared emitting diode to enable night vision in some examples.

It should be appreciated that in the example of FIG. 4C, the lights 452A and/or 452B, the speaker 454, and the microphone 456 implement an instance of the user interface 412 of FIG. 4A. It should also be appreciated that the image sensor assembly 450 and the lights 452A and/or 452B implement an instance of the sensor assembly 420 of FIG. 4A. As such, the image capture device 520 illustrated in FIG. 4C is at least one example of the security sensor 422 illustrated in FIG. 4A. The image capture device 520 may be a battery-powered indoor sensor configured to be installed and operated in an indoor environment, such as within a home, office, store, or other commercial or residential building, for example.

Figure 5:
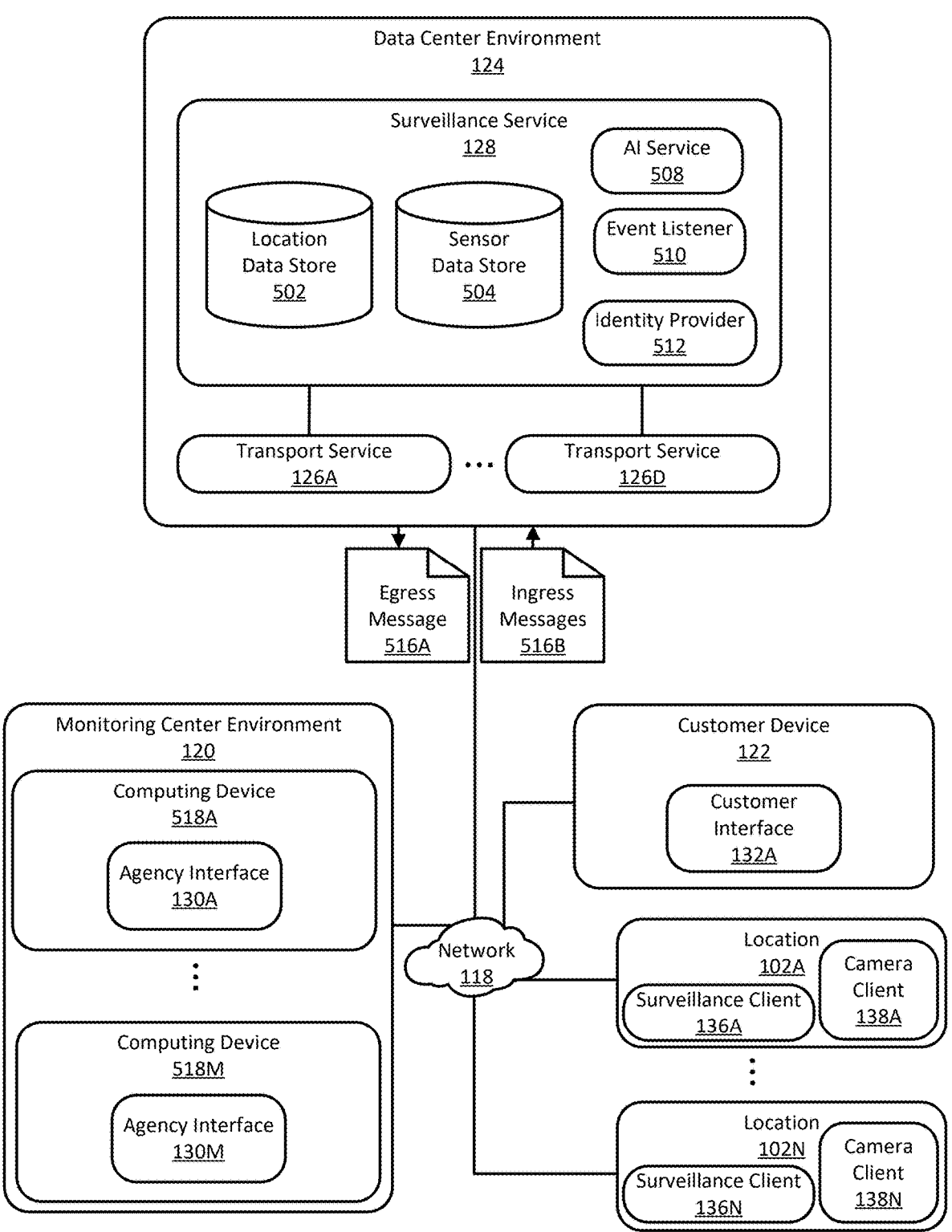
FIG. 5 is a schematic diagram of a data center environment, a monitoring center environment, and a customer device, according to some examples described herein.

Turning now to FIG. 5, aspects of the data center environment 124 of FIG. 1, the monitoring center environment 120 of FIG. 1, one of the customer devices 122 of FIG. 1, the network 118 of FIG. 1, and a plurality of monitored locations 102A through 102N of FIG. 1 (collectively referred to as the locations 102) are schematically illustrated. As shown in FIG. 5, the data center environment 124 hosts the surveillance service 128 and the transport services 126 (individually referred to as the transport services 126A through 126D). The surveillance service 128 includes a location data store 502, a sensor data store 504, an artificial intelligence (AI) service 508, an event listening service 510, and an identity provider 512. The monitoring center environment 120 includes computing devices 518A through 518M (collectively referred to as the computing devices 518) that host agency interfaces 130A through 130M. Individual locations 102A through 102N include base stations (e.g., the base station 114 of FIG. 1, not shown) that host the surveillance clients 136A through 136N (collectively referred to as the surveillance clients 136) and image capture devices (e.g., the image capture device 110 of FIG. 1, not shown) that host the software camera clients 138A through 138N (collectively referred to as the camera clients 138).

As shown in FIG. 5, the transport services 126 are configured to process ingress messages 516B from the customer interface 132A, the surveillance clients 136, the camera clients 138, and/or the agency interfaces 130. The transport services 126 are also configured to process egress messages 516A addressed to the customer interface 132A, the surveillance clients 136, the camera clients 138, and the agency interfaces 130. The location data store 502 is configured to store, within a plurality of records, location data in association with identifiers of customers (e.g., user account identifiers) for whom the location is monitored. For example, the location data may be stored in a record with an identifier of a customer and/or an identifier of the location to associate the location data with the customer and the location. The sensor data store 504 is configured to store, within a plurality of records, sensor data (e.g., one or more frames of image data) separately from other location data but in association with identifiers of locations and timestamps at which the sensor data was acquired. In some examples, the sensor data store 504 is optional and may be used, for example, where the sensor data housed therein has specialized storage or processing requirements.

Continuing with the example of FIG. 5, the AI service 508 is configured to process sensor data (e.g., images and/or sequences of images) to identify movement, human faces, and other features within the sensor data. The event listening service 510 is configured to scan location data transported via the ingress messages 516B for event data and, where event data is identified, execute one or more event handlers to process the event data. In some examples, the event handlers can include an event reporter that is configured to identify reportable events and to communicate messages specifying the reportable events to one or more recipient processes (e.g., a customer interface 132 and/or an agency interface 130). In some examples, the event listening service 510 can interoperate with the AI service 508 to identify events from sensor data. The identity provider 512 is configured to receive, via the transport services 126, authentication requests from the surveillance clients 136 or the camera clients 138 that include security credentials. When the identity provider 512 can authenticate the security credentials in a request (e.g., via a validation function, cross-reference look-up, or some other authentication process), the identity provider 512 can communicate a security token in response to the request. A surveillance client 136 or a camera client 138 can receive, store, and include the security token in subsequent ingress messages 516B, so that the transport service 126A is able to securely process (e.g., unpack/parse) the packages included in the ingress messages 516B to extract the location data prior to passing the location data to the surveillance service 128.

Continuing with the example of FIG. 5, the transport services 126 are configured to receive the ingress messages 516B, verify the authenticity of the messages 516B, parse the messages 516B, and extract the location data encoded therein prior to passing the location data to the surveillance service 128 for processing. This location data can include any of the location data described above with reference to FIG. 1. Individual transport services 126 may be configured to process ingress messages 516B generated by location-based monitoring equipment of a particular manufacturer and/or model. The surveillance clients 136 and the camera clients 138 are configured to generate and communicate, to the surveillance service 128 via the network 118, ingress messages 516B that include packages of location data based on sensor information received at the locations 102.

Continuing with the example of FIG. 5, the computing devices 518 are configured to host the agency interfaces 130. In some examples, individual agency interfaces 130A-130M are configured to render GUIs including one or more image frames and/or other sensor data. In certain examples, the customer device 122 is configured to host the customer interface 132. In some examples, customer interface 132 is configured to render GUIs including one or more image frames and/or other sensor data. Additional features of the agency interfaces 130 and the customer interface 132 are described further below with reference to FIG. 6.

Figure 6:
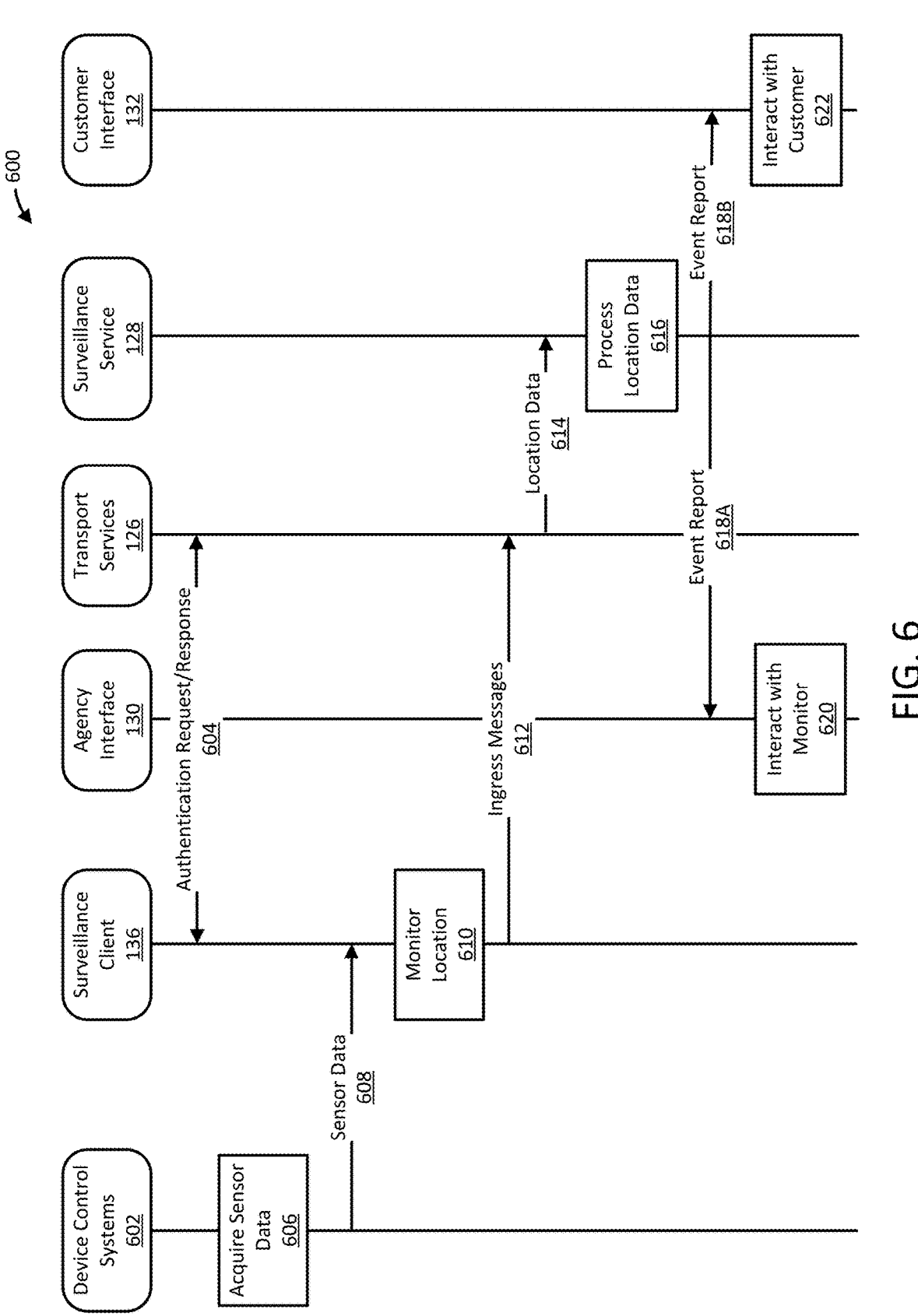
FIG. 6 is a sequence diagram of a monitoring process, according to some examples described herein.

Turning now to FIG. 6, a monitoring process 600 is illustrated as a sequence diagram. The process 600 can be executed, in some examples, by a security system (e.g., the security system 100 of FIG. 1). More specifically, in some examples, at least a portion of the process 600 is executed by the location-based devices under the control of device control system (DCS) code (e.g., one or more of the code sets 208, 308, or 408 of FIGS. 2-4C) implemented by at least one processor (e.g., one or more of the processors 200, 300, or 400 of FIGS. 2-4C). The DCS code can include, for example, a camera client (e.g., the camera client 138 of FIG. 1). At least a portion of the process 600 is executed by a base station (e.g., the base station 114 of FIG. 1) under control of a surveillance client (e.g., the surveillance client 136 of FIG. 1). At least a portion of the process 600 is executed by a monitoring center environment (e.g., the monitoring center environment 120 of FIG. 1) under control of an agency interface (e.g., the agency interface 130 of FIG. 1). At least a portion of the process 600 is executed by a data center environment (e.g., the data center environment 124 of FIG. 1) under control of a surveillance service (e.g., the surveillance service 128 of FIG. 1) or under control of transport services (e.g., the transport services 126 of FIG. 1). At least a portion of the process 600 is executed by a customer device (e.g., the customer device 122 of FIG. 1) under control of a customer interface (e.g., customer interface 132 of FIG. 1).

As shown in FIG. 6, the process 600 starts with the surveillance client 136 authenticating with an identity provider (e.g., the identity provider 512 of FIG. 5) by exchanging one or more authentication requests and responses 604 with the transport service 126. More specifically, in some examples, the surveillance client 136 communicates an authentication request to the transport service 126 via one or more API calls to the transport service 126. In these examples, the transport service 126 parses the authentication request to extract security credentials therefrom and passes the security credentials to the identity provider for authentication. In some examples, if the identity provider authenticates the security credentials, the identity provider generates a security token and transmits the security token to the transport service 126. The transport service 126, in turn, receives a security token and communicates the security token as a payload within an authentication response to the authentication request. In these examples, if the identity provider is unable to authenticate the security credentials, the transport service 126 generates an error code and communicates the error code as the payload within the authentication response to the authentication request. Upon receipt of the authentication response, the surveillance client 136 parses the authentication response to extract the payload. If the payload includes the error code, the surveillance client 136 can retry authentication and/or interoperate with a user interface of its host device (e.g., the user interface 212 of the base station 114 of FIG. 2) to render output indicating the authentication failure. If the payload includes the security token, the surveillance client 136 stores the security token for subsequent use in communication of location data via ingress messages. It should be noted that the security token can have a limited lifespan (e.g., 1 hour, 1 day, 1 week, 1 month, etc.) after which the surveillance client 136 may be required to reauthenticate with the transport services 126.

Continuing with the process 600, one or more DCSs 602 hosted by one or more location-based devices acquire 606 sensor data descriptive of a location (e.g., the location 102A of FIG. 1). The sensor data acquired can be any of a variety of types, as discussed above with reference to FIGS. 1-4C. In some examples, one or more of the DCSs 602 acquire sensor data continuously. In some examples, one or more of the DCSs 602 acquire sensor data in response to an event, such as expiration of a local timer (a push event) or receipt of an acquisition polling signal communicated by the surveillance client 136 (a poll event). In certain examples, one or more of the DCSs 602 stream sensor data to the surveillance client 136 with minimal processing beyond acquisition and digitization. In these examples, the sensor data may constitute a sequence of vectors with individual vector members including a sensor reading and a timestamp. Alternatively or additionally, in some examples, one or more of the DCSs 602 execute additional processing of sensor data, such as generation of one or more summaries of multiple sensor readings. Further still, in some examples, one or more of the DCSs 602 execute sophisticated processing of sensor data. For instance, if the security sensor includes an image capture device, the security sensor may execute image processing routines such as edge detection, motion detection, facial recognition, threat assessment, and reportable event generation.

Continuing with the process 600, the DCSs 602 communicate the sensor data 608 to the surveillance client 136. As with sensor data acquisition, the DCSs 602 can communicate the sensor data 608 continuously or in response to an event, such as a push event (originating with the DCSs 602) or a poll event (originating with the surveillance client 136).

Continuing with the process 600, the surveillance client 136 monitors 610 the location by processing the received sensor data 608. For instance, in some examples, the surveillance client 136 executes one or more image processing routines. These image processing routines may include any of the image processing routines described above with reference to the operation 606. By distributing at least some of the image processing routines between the DCSs 602 and surveillance clients 136, some examples decrease power consumed by battery-powered devices by off-loading processing to line-powered devices. Moreover, in some examples, the surveillance client 136 may execute an ensemble threat detection process that utilizes sensor data 608 from multiple, distinct DCSs 602 as input. For instance, in at least one example, the surveillance client 136 will attempt to corroborate an open state received from a contact sensor with motion and facial recognition processing of an image of a scene including a window to which the contact sensor is affixed. If two or more of the three processes indicate the presence of an intruder, the threat score is increased and or a break-in event is declared, locally recorded, and communicated. Other processing that the surveillance client 136 may execute includes outputting local alarms (e.g., in response to detection of particular events and/or satisfaction of other criteria) and detection of maintenance conditions for location-based devices, such as a need to change or recharge low batteries and/or replace/maintain the devices that host the DCSs 602. Any of the processes described above within the operation 610 may result in the creation of location data that specifies the results of the processes.

Continuing with the process 600, the surveillance client 136 communicates the location data 614 to the surveillance service 128 via one or more ingress messages 612 to the transport services 126. As with sensor data 608 communication, the surveillance client 136 can communicate the location data 614 continuously or in response to an event, such as a push event (originating with the surveillance client 136) or a poll event (originating with the surveillance service 128).

Continuing with the process 600, the surveillance service 128 processes 616 received location data. For instance, in some examples, the surveillance service 128 executes one or more routines described above with reference to the operations 606 and/or 610. Additionally or alternatively, in some examples, the surveillance service 128 calculates a threat score or further refines an existing threat score using historical information associated with the location identified in the location data and/or other locations geographically proximal to the location (e.g., within the same zone improvement plan (ZIP) code). For instance, in some examples, if multiple break-ins have been recorded for the location and/or other locations within the same ZIP code within a configurable time span including the current time, the surveillance service 128 may increase a threat score calculated by a DCS 602 and/or the surveillance client 136. In some examples, the surveillance service 128 determines, by applying a set of rules and criteria to the location data 614, whether the location data 614 includes any reportable events and, if so, communicates an event report 618A and/or 618B to the agency interface 130 and/or the customer interface 132. A reportable event may be an event of a certain type (e.g., break-in) or an event of a certain type that satisfies additional criteria. For example, movement within a particular zone combined with a threat score that exceeds a threshold value may be a reportable event, while movement within the particular zone combined with a threat score that does not exceed a threshold value may be a non-reportable event. The event reports 618A and/or 618B may have a priority based on the same criteria used to determine whether the event reported therein is reportable or may have a priority based on a different set of criteria or rules.

Continuing with the process 600, the agency interface 130 interacts 620 with monitoring personnel through, for example, one or more GUIs. These GUIs may provide details and context regarding one or more reportable events.

Continuing with the process 600, the customer interface 132 interacts 622 with at least one customer through, for example, one or more GUIs. These GUIs may provide details and context regarding one or more reportable events.

It should be noted that the processing of sensor data and/or location data, as described above with reference to the operations 606, 610, and 616, may be executed by processors disposed within various parts of the system 100. For instance, in some examples, the DCSs 602 execute minimal processing of the sensor data (e.g., acquisition and streaming only) and the remainder of the processing described above is executed by the surveillance client 136 and/or the surveillance service 128. This approach may be helpful to prolong battery runtime of location-based devices. In other examples, the DCSs 602 execute as much of the sensor data processing as possible, leaving the surveillance client 136 and the surveillance service 128 to execute only processes that require sensor data that spans location-based devices and/or locations. This approach may be helpful to increase scalability of the system 100 with regard to adding new locations.

Figure 7:
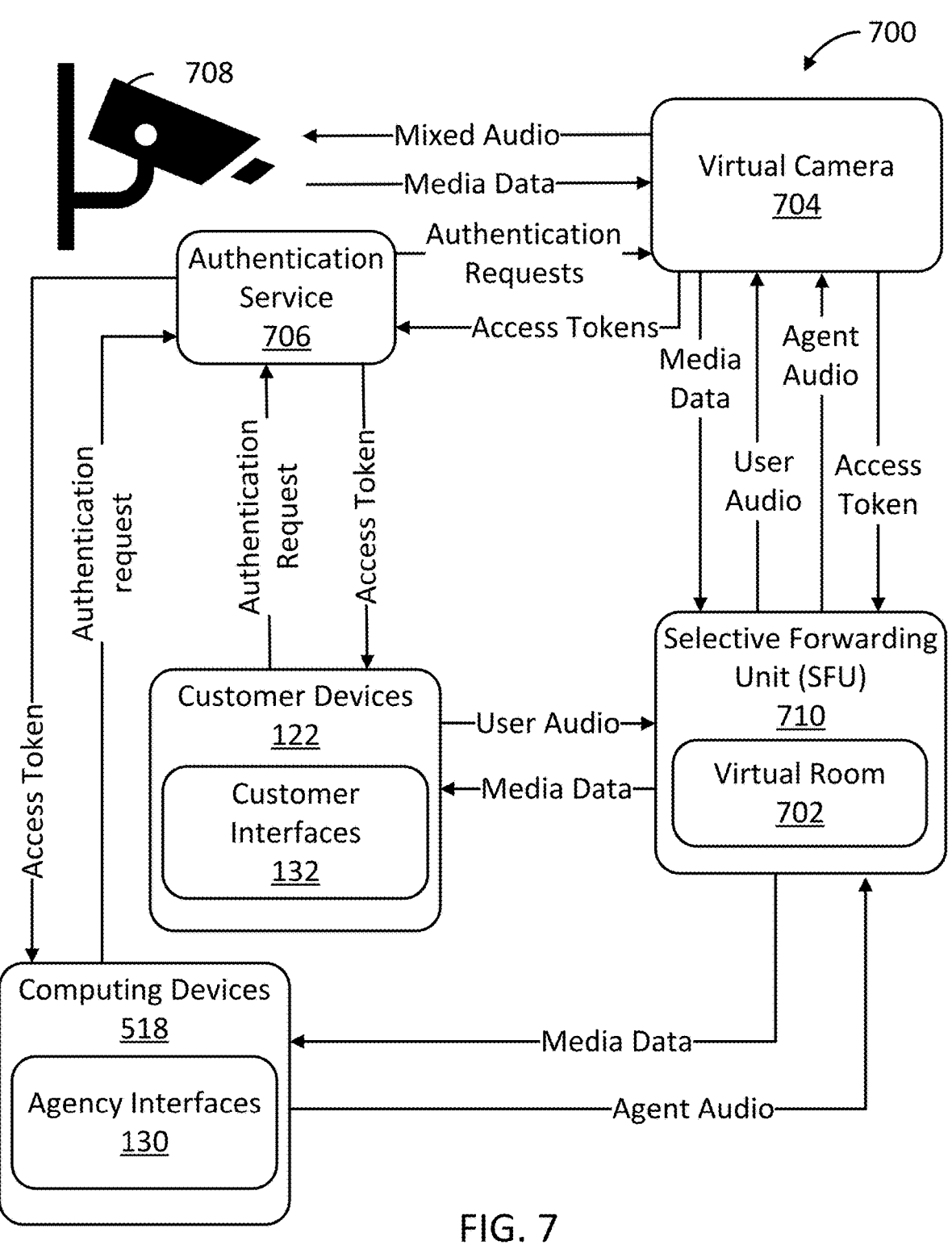
FIG. 7 is a schematic diagram of audio data processing, according to some examples described herein.

Turning now to FIG. 7, an architecture 700 of processes, services, and devices that are configured collectively to implement audio data processing (e.g., filtering) are schematically illustrated. As shown in FIG. 7, the architecture 700 includes customer devices 122 of FIG. 1, computing devices 518, and a monitoring device 708. The monitoring device 708 may be implemented by a variety of devices configured to acquire and output data or information. As such, the monitoring device 708 may include one or more of the devices 110 and 104 of FIG. 1. The architecture 700 may further include services, such as the authentication service 706, a virtual camera 704, and a selective forwarding unit (SFU) 710. The services 706, 704, and 710 may be hosted by one or more servers through which communication between the devices and services may be configured to route. In certain examples, the authentication service 706 may incorporate, or interoperate with, the identify provider 512 of FIG. 5. In some examples, the authentication service 706, the SFU 710, and the virtual camera 704 are hosted by a data center environment (e.g., the data center environment 124 of FIG. 1). Further, in certain examples, the SFU 710 is configured to establish a virtual room 702, which is an object with a variety of properties and methods, as described below.

Figure 10:
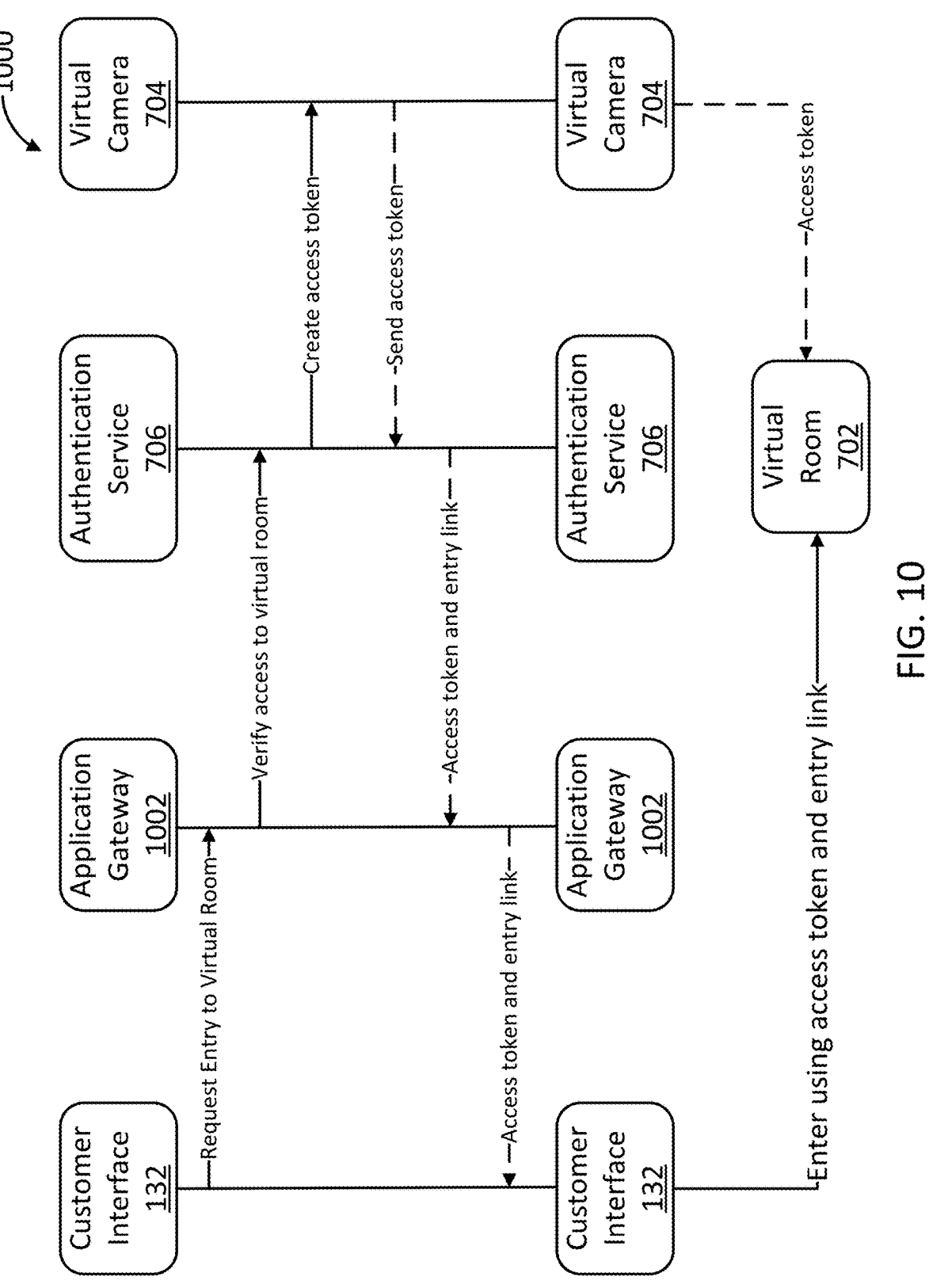
FIG. 10 is a sequence diagram of an access protocol for a virtual room, according to some examples described herein.

In some examples, the devices 122, 518, and 708 are configured to connect to the virtual room 702. The virtual camera 704 may be configured to assign individual devices 122, 518, 708 a role or priority within the virtual room 702. More specifically, in some cases, monitoring devices 708 may be assigned a "camera" role, customer devices 122 may be assigned a "customer" role, and computing devices 518 may be assigned an "agent" role. The virtual camera 704 may be configured to assign roles based on the type of device used to access the virtual room 702, the user account signed into the device, or as part of the process to admit a device into the virtual room 702. FIG. 10, which is described further below, illustrates one example of a process that some implementations of the virtual camera 704 are configured to participate in to assign roles. The virtual room 702 may, in some cases, be instantiated by a selective forwarding unit (SFU) 710 that organizes connections (e.g., WebRTC connections) into groups that share media streams with each other. One example of an SFU 710 can be found within the LiveKit SFU package available at github.com. In some examples, the devices 518, 122, 708 are configured to interoperate with the SFU 710 to establish individual WebRTC connections. Likewise, in some examples, the SFU 710 is configured to interoperate with the devices 122, 518, 710 to establish the individual WebRTC connections. Once the WebRTC connections are established, the endpoint devices 518, 122, 708 may communicate with one another via the virtual room 702. The monitoring device 708 may be connected to the SFU 710 via the virtual camera 704 which may control operation of the virtual room via one or more API calls supported by the SFU 710.

The SFU 710 may be configured to shares data received from one or more source devices among all of the devices connected to the virtual room 702. For example, if one of the devices is a monitoring device 708, such as a camera, the device may be configured to send audio and/or video data to the virtual room 702, which may then be relayed from the virtual room 702 to the other devices in the virtual room 702. If the monitoring device 708 has the camera role, it may be configured to communicate media data to the virtual room as it is collected, enabling users near devices connected to the virtual room to monitor the environment around the monitoring device 708 in real time. As another example, if one of the devices is a customer device 122, the user in control of the device may choose to view data communicated to the virtual room 702 and/or may choose to send data, such as user audio data, to the virtual room 702. In some cases, a virtual room 702 may be understood to be associated with a single monitoring device 708 with a camera role for that virtual room. In other cases, the virtual room 702 may be associated with a plurality of monitoring devices 708 installed in a location, each of which has the camera role within the virtual room 702.

The virtual room 702 may be configured to receive audio data from the customer device 122. In those configurations, other devices connected to the virtual room 702 may be configured to in turn receive the audio data from the virtual room. A similar process may work in reverse, where the customer device 122 may receive audio data sent by other devices in the virtual room, such as other customer devices 122. In this way, participants with devices connected to the virtual room 702 may communicate with each other via the virtual room 702. In some cases, monitoring devices 708 may be configured to receive audio data from other participants. In those cases, the device 708 may be configured to broadcast, via a speaker, the user audio data to the environment around the device.

Processes hosted by the customer device 122 and computing devices 518 (e.g., the processes 132 and 130) may be configured to interoperate with processes hosted by the data center environment via an application gateway, such as the application gateway 1002 described further below with reference to FIG. 10. This application gateway may be a transport service (e.g., one of the transport services 126 of FIG. 1) or a part of a transport service. In certain examples, the customer device 122 and computing devices 518 may be configured to interoperate with the virtual camera 704 by sending and responding to one or more API calls to and from the application gateway. In some examples, the virtual camera 704 may be configured to, in response to receiving API calls, establish the virtual room 702, supply the device which supplied the API calls (the "calling device") and process with an entry token and link, and/or control the physical operation of the monitoring device 708. When the room is established, the calling device may be configured to connect with the virtual room 702 via a WebRTC connection, the virtual camera 704 may be configured to connect with the monitoring device 708 via a WebRTC connection, and/or the virtual camera 704 may be configured to connect with the virtual room 702 via a WebRTC connection.

The virtual camera 704 may process data sent to and from the monitoring device 708 and, in turn, to and from the virtual room 702 in various ways. For example, in some configurations, the virtual camera may receive audio data from multiple participants, such as multiple devices with the customer role, and combine the received data into one mixed audio track before sending that mixed audio to the device 708. The virtual camera 704 may also filter audio data based on the number and/or roles of participants connected to the virtual room 702 as described below with respect to FIGS. 8, 9, and 11. The virtual camera may then output the filtered audio data to the virtual room 702. Further, in some examples, the virtual camera may output the filtered audio back to the virtual room for distribution to the interfaces 132 and/or 130. It should be noted, however, that in some examples audio data received from one of the devices 122 and 518 is distributed by the virtual room 702 and the SFU 710 to the other of the devices 122 and 518 even where the audio data is muted (e.g., by the virtual camera 704) from the mixed audio sent to the device 708.

The virtual camera 704 may also be configured to limit entry to the virtual room for devices with the customer and agent roles. In order to access the virtual room, a device may contact an authentication service 706 which verifies that the device trying to access the virtual room 702 has authority to do so. The authentication service 706 may request an access token from the virtual camera 704. The virtual camera 704 may, in turn, create an access token for the calling device and respond to the request with the access token and/or an entry link (e.g., a URL) to the virtual room 702 via the authentication service 706. While sending the access token to the authentication service 706, the virtual camera 704 may also send a copy of the created access token to the SFU 710. In those cases, the SFU 710 may compare tokens received from the virtual camera 704 with tokens held by the calling device, and to admit entry to the virtual room only to those devices which hold an identical token to one held by the SFU 710. The access token may allow the calling device to access the virtual room 702 and may define a role for the calling device within the virtual room. In some cases, the tokens may be time-limited so that they allow a device access to the virtual room only for a predetermined period of time such as one minute, ten minutes, one hour, one day, or another period of time.

Accounts for customers and/or agents may have a list of unique device IDs (UUIDs) they have permission to access. The authentication service 706 may be configured to verify the identity of the participant trying to access the virtual room by comparing the UUID of one or more of the monitoring devices 708 associated with the virtual room 702 to a list of UUIDs available to the customer or agent. The authentication service 706 may be configured to direct the virtual camera to issue an access token only when one of the associated devices 708 is available to the requesting participant.

Figure 8:
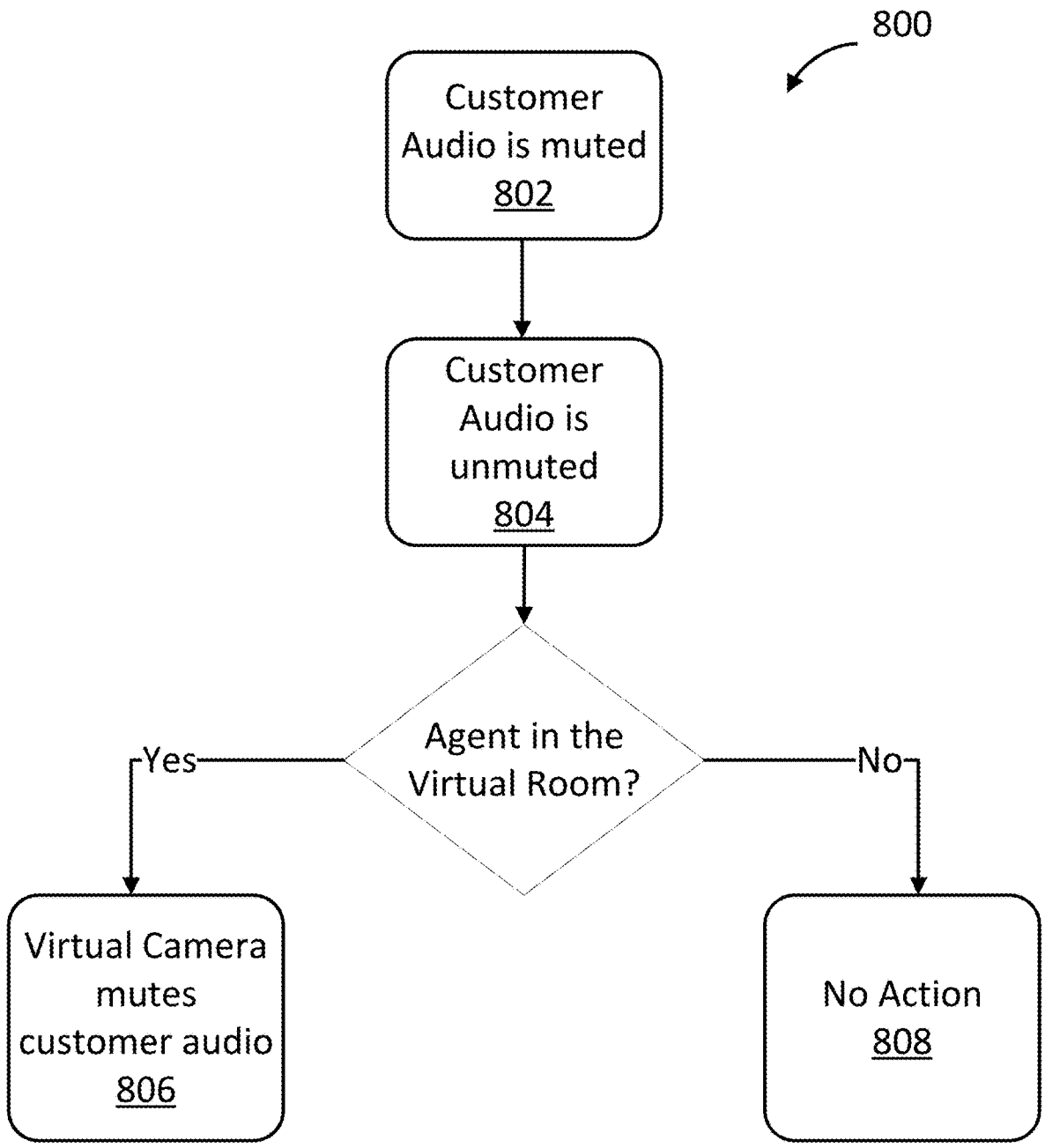
FIG. 8 is a flow diagram of a subroutine or other grouping of code to process audio data, according to some examples described herein.

Turning now to FIG. 8, a flow diagram of a subroutine or other grouping of code 800 to process (e.g., filter) audio data is illustrated. The subroutine 800 is initiated by a device with the customer role 122 connected to the virtual room 702 (not pictured). For instance, in some examples, the device connects to the room 702 via an entry link and access token, as is described further below with reference to FIG. 10. The subroutine 800 includes a step with the customer audio muted 802. In some configurations, devices with the customer role may enter the virtual room 702 in one of two emission states, muted or unmuted, and individuals operating customer devices 122 may freely mute the devices. Muting the device may be accomplished locally or remotely. For instance, in some examples, a customer interface (e.g., one of the customer interfaces 132 of FIG. 7) may receive input requesting that audio collected by its host (e.g., one of the customer devices 122 of FIG. 7) be muted. In this example, the customer interface may send a request to an operating system of its host device to mute a microphone incorporated into the host device, and the operating system may mute the microphone in response to the request. Alternatively or additionally, the device may be muted remotely by, for example, the virtual camera 704 during mixing of audio data by the virtual camera 704 (e.g., by not mixing the audio stream of the device into the mixed audio). The virtual camera 704 may also mute the device by sending one or more API calls to the SFU 710 to mute audio data received from the device. In some configurations, the device may be muted by the virtual camera 704 upon entering the room 702.

When a customer device 122 attempts to unmute 804 in the virtual room 702, the virtual camera 704 may be configured to check if any devices 518 with the agent role (such as the computing device 518 of FIG. 5) are present in the virtual room 702. For instance, an individual using a customer device 122 may attempt to unmute 804 by interacting with the customer interface 132 of the device 122. The presence of a computing device 518 may be determined by the virtual camera 704 by referencing the roles of individual devices currently within the virtual room. For instance, the virtual camera 704 may access, e.g., upon entry of the devices into the virtual room, a priority field embedded in each of the access tokens held by devices connected to the virtual room, which may contain information regarding the associated device's role and/or priority within the virtual room. If no computing devices 518 are present, then the customer may freely unmute their device 808. If an agent is present (i.e., a computing device 518 is connected to the virtual room), the virtual camera 704 may be configured to prevent 806 the customer device 122 from becoming unmuted. For example, when a request is sent to the virtual camera 704 to unmute a device, the virtual camera 704 may choose to not unmute the device if the virtual camera detects (e.g., via token inspection, as described above) that a computing device 518 is also present in the virtual room 702. In those cases, the computing device 518 may present (e.g., via one of the agency interfaces 130 of FIG. 7) an option to unmute or mute the customer device 122. The virtual camera may remotely control the customer device 122 by sending one or more API calls to the customer interface 132 hosted by the customer device. Alternatively or additionally, the virtual camera may control audio data generated by the customer device while mixing audio data. In some other cases, customer devices 122 will only have the option to unmute when a connected computing device 518 is muted. In those cases, a computing device 518 being unmuted within the room 702 may cause all connected and unmuted customer devices 122 to become muted. For instance, the virtual room 702 may receive a request from a computing device 518 (e.g., via one or more API calls) to become unmuted. The virtual room 702 may notify the virtual camera 704 of the request. The virtual camera 704 may further, in turn, passively allow the unmuting to occur (e.g., by taking no action to prevent or reverse the unmuting) or, in some examples, may actively interoperate with the virtual room 702 to unmute the computing device 518 in the virtual room 702. When passively or actively unmuting the computing device 518, the virtual camera 704 may simultaneously interoperate with the virtual room 702 to mute, suppress, or filter out audio from other devices connected to the virtual room 702.

In some other cases, customer devices 122 will be muted only to particular devices, such as only to devices with the camera role and/or other devices with the customer role. In those cases, the SFU 710 may send audio data from a customer device 122 to some devices connected to the virtual room 702, but not others. For instance, the virtual camera 704 may filter audio between customer devices 122, such that a connected computing device 518 may receive audio data from multiple connected customer device 122, but each customer device 122 or a connected monitoring device 708 will not receive audio from other customer devices. In some cases, all or part of the filtering may be processed by the virtual room 702, by the virtual camera 704, or by interoperation of the two. In some configurations, a connected computing device 518 may present (e.g., via an agency interface, such as one of the agency interfaces 130) an option to unmute one connected customer device 122 with respect to another connected device with the customer and/or camera role. In these examples, the connected computing 518 device may interoperate (e.g., via one or more API calls) with the virtual room 702 (which may, in turn, interoperate with the virtual camera 704) to mute the other device in response to reception of a selection of the option. For instance, the agency interface 130 may present an option to mute or unmute a customer device 122 connected to the virtual room 702 with respect to a monitoring device 708 connected to the same virtual room, thereby either including or suppressing audio from that customer device 122 in the mixed audio sent to the monitoring device 708. In some configurations, selection of the option may cause the virtual room 702 and the virtual camera 704 to interoperate (e.g., via one or more API calls) to filter out audio from the customer device 122 from the audio received by the monitoring device 708. In some further configurations, the virtual camera 704 may automatically mute and unmute individual connected devices with respect to each other.

Figure 9:
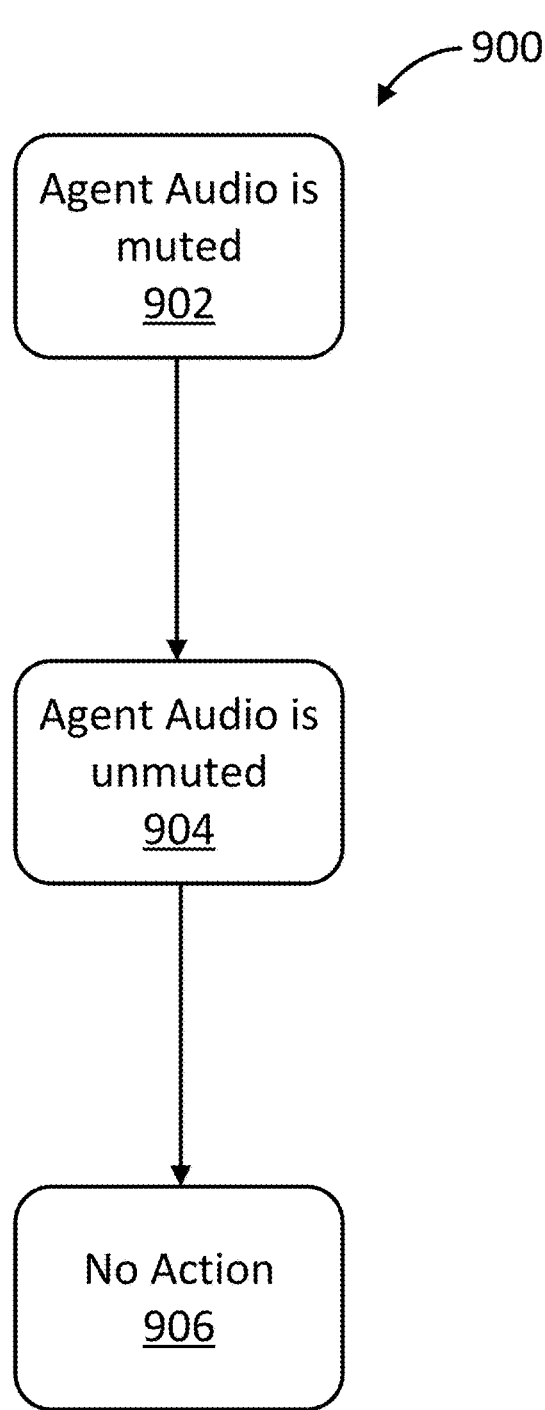
FIG. 9 is a flow diagram of another subroutine or other grouping of code to process audio data, according to some examples described herein.

Turning now to FIG. 9, a flow diagram of part of an audio filtering process 900 is illustrated. The process 900 is initiated by a computing device 518 (such as the computing device 518 of FIG. 7) connected to the virtual room 702 (not pictured). Computing devices 518 may enter the virtual room muted or unmuted and may freely mute themselves. For instance, a computing device 518 may include an agency interface 130 which may present an option to enter the virtual room 702 muted or unmuted. When the computing device 518 is muted 902, no audio from the computing device 518 is received and/or mixed. The computing device may unmute 904 freely. Unmuting may be accomplished by, for instance, interacting with a control on an agency interface (e.g., one of the agency interfaces 130 of FIG. 7) of the computing device 518, which the agency interface 130 may provide while the computing device 518 is connected to the virtual room 702. When a computing device 518 attempts to unmute within the virtual room 702, the device is unmuted 906 (i.e., virtual camera takes no action to remute the device). For instance, once the button on the agency interface 130 is interacted with, the virtual room 702 may receive audio data from the computing device 518 and transmit it to other devices within the virtual room 702. In some cases, computing devices 518 may present (e.g., via an agency interface, such as one of the agency interfaces 130) an option to mute 902 or unmute 904 themselves only to particular devices in the virtual room 702.

Turning now to FIG. 10, a sequence diagram of an entry process 1000 for a virtual room 702 (e.g., the virtual room 702 of FIG. 7) is illustrated. The process 1000 is illustrated with respect to customer device 122 accessing the virtual room but may be understood to represent the process a computing device 518 uses to access the room 702.

The process 1000 begins with a customer interface 132 associated with a customer device 122 with the customer role. A customer device 122 may host a customer interface 132. The interface 132 may be used to request access to the virtual room 702. To do so, the customer interface 132 sends an entry request to the application gateway 1002. The application gateway 1002, which may be hosted in a data center environment (e.g., the data center 124 of FIG. 1 as one of the transport services 126 or a part thereof), may then send the request to the authentication service 706 to verify that the logged in customer is authorized to access the virtual room. In some configurations, authorization to access the virtual room may be confirmed by comparing the UUID of a monitoring device (e.g., the monitoring device 708 of FIG. 7) within the virtual room or that the virtual room is associated with to a list of UUIDs available to the customer device 122. The authentication service 706, upon confirming that the customer device 122 is authorized to access the virtual room, may then send a request to the virtual camera 704 to generate an access token for the virtual room. The access token generated may have different parameters based on the account of the user logged into the device requesting it. For instance, if the logged-in user is associated with a "customer" account, then the token may be encoded with a customer role or priority. Alternatively, if the logged-in user is associated with an "agent" account, then the token may be encoded with an agent role or priority.

After generating the access token, the virtual camera 704 sends it back toward the customer device 122 via the authentication service 706. Upon receiving the token, the authentication service may produce an entry link (which may be in the form of a URL or another web address) and send it along with the access token to the customer device 122 via the application gateway 1002.

When the customer device 122 receives the access token and the entry link, the customer interface 132 may access the virtual room 702. In the virtual room, the customer interface 132 may allow an individual using the device 122 to view data collected by one or more devices with the camera role or communicate with other devices in the virtual room.

Turning now to FIG. 11, a flow diagram of an audio filtering process 1100 is illustrated. The process 1100 begins with establishing 1102 a virtual room (e.g., the virtual room 702 of FIG. 7) which may be accessed by two or more devices. For instance, in some examples, an SFU (e.g., the SFU 710 of FIG. 7) receives one or more API calls from a virtual camera (e.g., the virtual camera 704 of FIG. 7) requesting instantiation of the room 702. When a first device and a second device have accessed the virtual room 702, the room may receive first audio from the first device and/or may receive second audio from the second device. For instance, each device may include a microphone to pick up audio from individuals or environments near the device. In response to receiving a first audio from the first device, the process 1100 identifies the priority of the first device, and may identify 1108 the first device as a non-priority device, i.e., having lesser or no priority compared to other connected devices. In response to receiving a second audio from a second device, the process 1100 identifies the priority of the second device, and may identify 1110 the second device as a priority device, i.e., having greater priority compared to other connected devices. Devices with greater priority may be granted more permissions to processing operations than devices with lesser priority. Data sent to the virtual room from a device with higher priority may be emphasized to devices with lesser priority. The priority may be encoded within the access token and identified by referencing a value (e.g., "customer", "agent", "camera", etc.) in a priority field of the access token associated with that device, by referencing the type of device used to access the virtual room 702 and assigning priority based on the type of connected device, by referencing the user accounts associated with connected devices, or another way.

After identifying 1108 the first device as a non-priority device and identifying 1110 the second device as a priority device, the process 1100 may create audio data which includes the second audio from the second device and omits the first audio from the first device. This may be done by, for example, filtering out (e.g., not mixing) the first audio from the first device when creating the audio data, or reducing the output volume of the first audio from the first device when creating the audio data. In some cases, the process 1100 may output the created audio data substantially as it receives input audio data from the first and second devices. In those instances, the audio data may be created according to protocols which automatically filter the incoming audio data as desired (i.e., suppressing the first audio data and including the second audio data) before being output. The protocols used may depend on the types, roles, or priorities of devices which are connected to the virtual room. For instance, if the first audio data originates from a device with lower priority and the second audio data originates from a device with higher priority, the created audio data may suppress the first audio data and include the second audio data in the created audio data. Suppressed data may be muted, played at a lower volume, or otherwise deemphasized compared to non-suppressed data. The created audio data may then be broadcast to the virtual room, the environment around one or more of the monitoring devices 708 (not pictured), and/or somewhere else.

Figure 12:
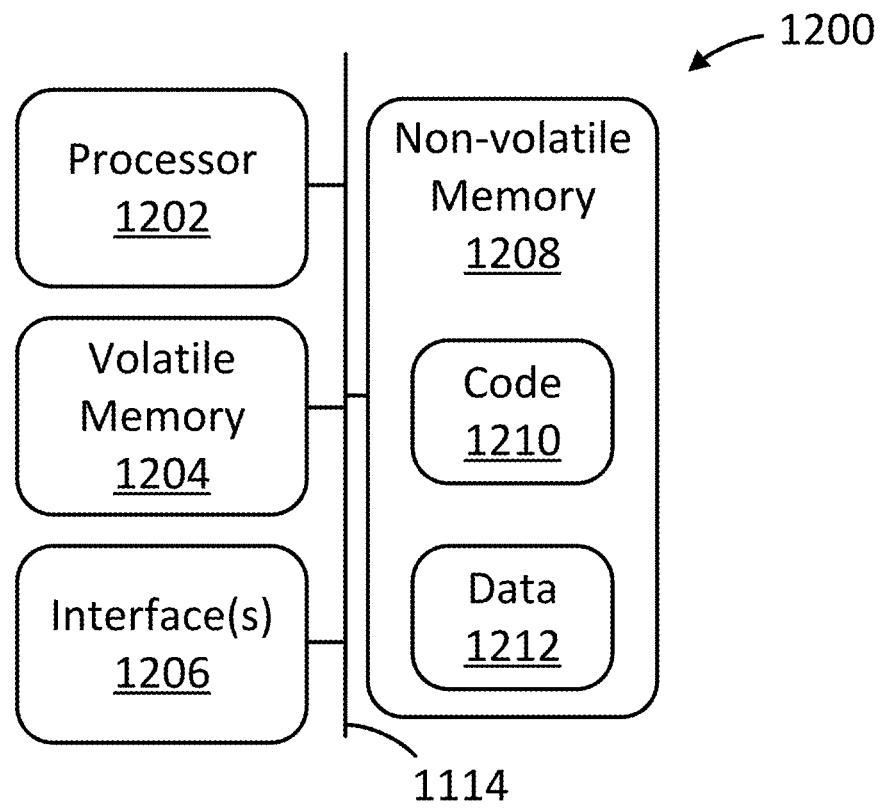
FIG. 12 is a schematic diagram of a computing device, according to some examples described herein.

Turning now to FIG. 12, a computing device 1200 is illustrated schematically. As shown in FIG. 12, the computing device includes at least one processor 1202, volatile memory 1204, one or more interfaces 1206, non-volatile memory 1208, and an interconnection mechanism 1214. The non-volatile memory 1208 includes code 1210 and at least one data store 1212.

In some examples, the non-volatile (non-transitory) memory 1208 includes one or more read-only memory (ROM) chips; one or more hard disk drives or other magnetic or optical storage media; one or more solid state drives (SSDs), such as a flash drive or other solid-state storage media; and/or one or more hybrid magnetic and SSDs. In certain examples, the code 1210 stored in the non-volatile memory can include an operating system and one or more applications or programs that are configured to execute under the operating system. Alternatively or additionally, the code 1210 can include specialized firmware and embedded software that is executable without dependence upon a commercially available operating system. Regardless, execution of the code 1210 can result in manipulated data that may be stored in the data store 1212 as one or more data structures. The data structures may have fields that are associated through colocation in the data structure. Such associations may likewise be achieved by allocating storage for the fields in locations within memory that convey an association between the fields. However, other mechanisms may be used to establish associations between information in fields of a data structure, including through the use of pointers, tags, or other mechanisms.

Continuing with the example of FIG. 12, the processor 1202 can be one or more programmable processors to execute one or more executable instructions, such as a computer program specified by the code 1210, to control the operations of the computing device 1200. As used herein, the term "processor" describes circuitry that executes a function, an operation, or a sequence of operations. The function, operation, or sequence of operations can be hard coded into the circuitry or soft coded by way of instructions held in a memory device (e.g., the volatile memory 1204) and executed by the circuitry. In some examples, the processor 1202 is a digital processor, but the processor 1202 can be analog, digital, or mixed. As such, the processor 1202 can execute the function, operation, or sequence of operations using digital values and/or using analog signals. In some examples, the processor 1202 can be embodied in one or more application specific integrated circuits (ASICs), microprocessors, digital signal processors (DSPs), graphics processing units (GPUs), neural processing units (NPUs), microcontrollers, field programmable gate arrays (FPGAs), programmable logic arrays (PLAs), or multicore processors. Examples of the processor 1202 that are multicore can provide functionality for parallel, simultaneous execution of instructions or for parallel, simultaneous execution of one instruction on more than one piece of data.

Continuing with the example of FIG. 12, prior to execution of the code 1210 the processor 1202 can copy the code 1210 from the non-volatile memory 1208 to the volatile memory 1204. In some examples, the volatile memory 1204 includes one or more static or dynamic random access memory (RAM) chips and/or cache memory (e.g., memory disposed on a silicon die of the processor 1202). Volatile memory 1204 can offer a faster response time than a main memory, such as the non-volatile memory 1208.

Through execution of the code 1210, the processor 1202 can control operation of the interfaces 1206. The interfaces 1206 can include network interfaces. These network interfaces can include one or more physical interfaces (e.g., a radio, an ethernet port, a USB port, etc.) and a software stack including drivers and/or other code 1210 that is configured to communicate with the one or more physical interfaces to support one or more LAN, PAN, and/or WAN standard communication protocols. The communication protocols can include, for example, TCP/IP and UDP among others. As such, the network interfaces enable the computing device 1200 to access and communicate with other computing devices via a computer network.

The interfaces 1206 can include user interfaces. For instance, in some examples, the user interfaces include user input and/or output devices (e.g., a keyboard, a mouse, a touchscreen, a display, a speaker, a camera, an accelerometer, a biometric scanner, an environmental sensor, etc.) and a software stack including drivers and/or other code 1210 that is configured to communicate with the user input and/or output devices. As such, the user interfaces enable the computing device 1200 to interact with users to receive input and/or render output. This rendered output can include, for instance, one or more GUIs including one or more controls configured to display output and/or receive input. The input can specify values to be stored in the data store 1212. The output can indicate values stored in the data store 1212.

Continuing with the example of FIG. 12, the various features of the computing device 1200 described above can communicate with one another via the interconnection mechanism 1214. In some examples, the interconnection mechanism 1214 includes a communications bus.

Figure 13:
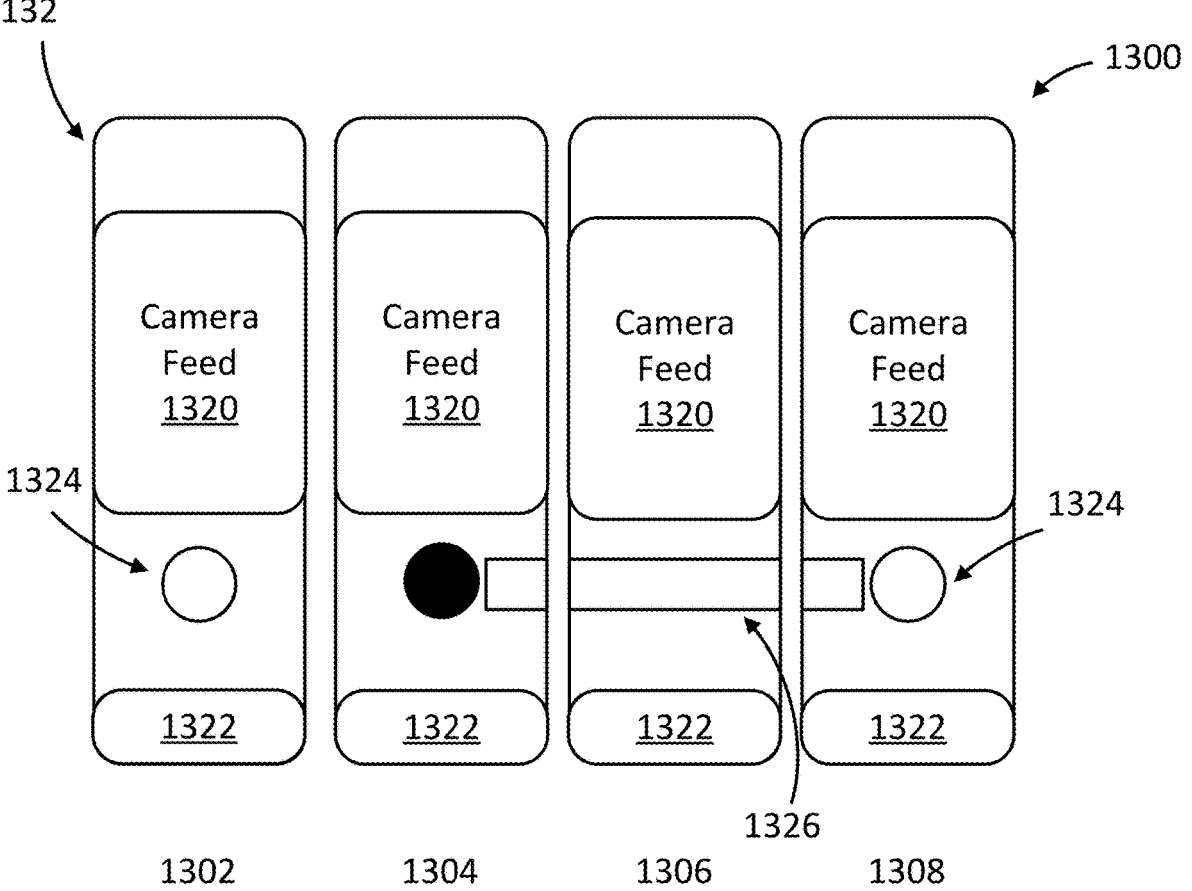
FIG. 13 is a depiction of a sequence of screens of a user interface during audio data processing, according to some examples described herein.

Turning now to FIG. 13, a progression 1300 of screens rendered by a customer device (e.g., one of the customer devices 122 of FIG. 7) under control of a customer interface (e.g., one of the customer interfaces 132 of FIG. 7) is depicted. As shown in FIG. 13, the progression of screens 1300 includes screens 1302, 1304, 1306, and 1308. The screens 1302-1308 include a camera feed control 1320 and a user control 1322. The screen 1302 may be rendered by the customer device when the customer device is connected to a virtual room (e.g., the virtual room 702 of FIG. 7). The customer interface may show a camera feed through the control 1320. The camera feed may be rendered by the customer device from a stream of video data collected by a monitoring device (e.g., the monitoring device 708 of FIG. 7) connected to the virtual room. The controls 1322 may represent utilities, including a volume control for requesting changes to the output volume of the customer device or a replay control for browsing recent video data collected by the monitoring device 708, among other functions. The customer interface may further include a microphone control 1324.

The first screen 1302 may be rendered by a customer device which is connected to a virtual room connected to devices with roles other than the agent role. In the first screen 1302, the customer device renders the microphone control 1324 in white to indicate that it is available. The device may be configured to receive, from a user, input interacting with the microphone control 1324. In those configurations, the customer interface may be configured to respond to the receipt of user input by activating a micro- phone connected to the customer device to acquire audio data and transmitting the acquired audio data to the virtual room. In some configurations, once the control 1324 is selected, the device may collect audio data until the control 1324 is selected again (a "toggle" configuration). In some other configurations, the device may collect audio data only so long as the microphone control 1324 is (e.g., continuously selected (a "hold" configuration).

The customer device may render the second screen 1304 when a device with the agent role enters the virtual room. The second screen 1304 shows part of an agent indicator 1326 rendered by the customer interface. The customer interface may control the customer device to render the agent indicator 1326 when a device with the agent role enters or is present in the virtual room to indicate the presence of such a device. In some configurations, when the customer interface is rendering the agent indicator 1326, the control 1324 may be rendered as black to indicate that it becomes disabled when the agent indicator is present in the virtual room. Customer devices connected to the virtual room 702 may be configured to not send audio data to the virtual room 702 when a device with the agent role enters the room.

The customer device may render the third screen 1306 while a device with the agent role is present in the virtual room. The third screen 1306 shows an agent indicator 1326 fully crossing the customer interface 132. When the agent indicator is fully present, the control 1324 is not rendered by the customer interface 132, and, as such, an individual using the customer device 122 may not interact with the control 1324. The customer interface 132 may be configured to cause the agent indicator 1326 to display text describing events in the virtual room, like an agent leaving or speaking in the virtual room. In some cases, devices with the agent role in the virtual room may unmute or remute connected devices with the customer role. In those cases, the agent indicator 1326 may be configured to indicate the mute state of the customer device in the virtual room.

The customer device may render the fourth screen 1308 when a device with the agent role leaves the virtual room. The fourth screen 1308 shows the agent indicator 1326 leaving the customer interface 132. The control 1324 here may be rendered as white, to indicate that when the control 1324 is selectable to allow the customer device 122 to control its mute state in the virtual room.

Figure 14:
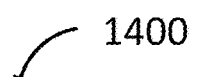
FIG. 14 is a schematic diagram of an audio processing device, according to some examples described herein.

Turning now to FIG. 14, a system configured to process audio data is schematically illustrated. The system illustrates a process 1400 for creating a stream of outbound priority audio data from inbound customer audio data and inbound agent audio data. Inbound audio data may originate from one of several different kinds of devices, including customer devices 122 having customer interfaces 132 and/or comput- ing devices 518 having agency interfaces 130. Audio data can be sent from each of the devices to a stream creation device 1402, which may mix the inbound audio data into a stream of outbound priority audio data in several different ways. Outbound priority audio data may be sent from the stream creation device 1402 to a monitoring device 708 or to another endpoint device.

In some examples, the stream creation device 1402 can mix inbound audio data based on the priority of the inbound audio data or of the device sending the inbound audio data to the stream creation device 1402. In one example, two inbound streams of audio data come from devices with the same priority. In that case, the stream creation device 1402 may create an outbound stream of audio data which includes both inbound audio data streams. In another example, where there is inbound audio data from two devices having differ- ent priorities (i.e., a greater priority and a lesser priority), the stream creation device 1402 may create a stream of priority audio data to output which includes the inbound audio data from the device having greater priority and does not include the inbound audio data from the device having lesser pri- ority. For instance, in some instances the computing device 518 may have greater priority than the customer device 122. In those instances, the stream creation device 1402 may create a stream of priority audio data by including audio data received from the computing device 518, but not including audio data received from customer device 130.

Figure 15:
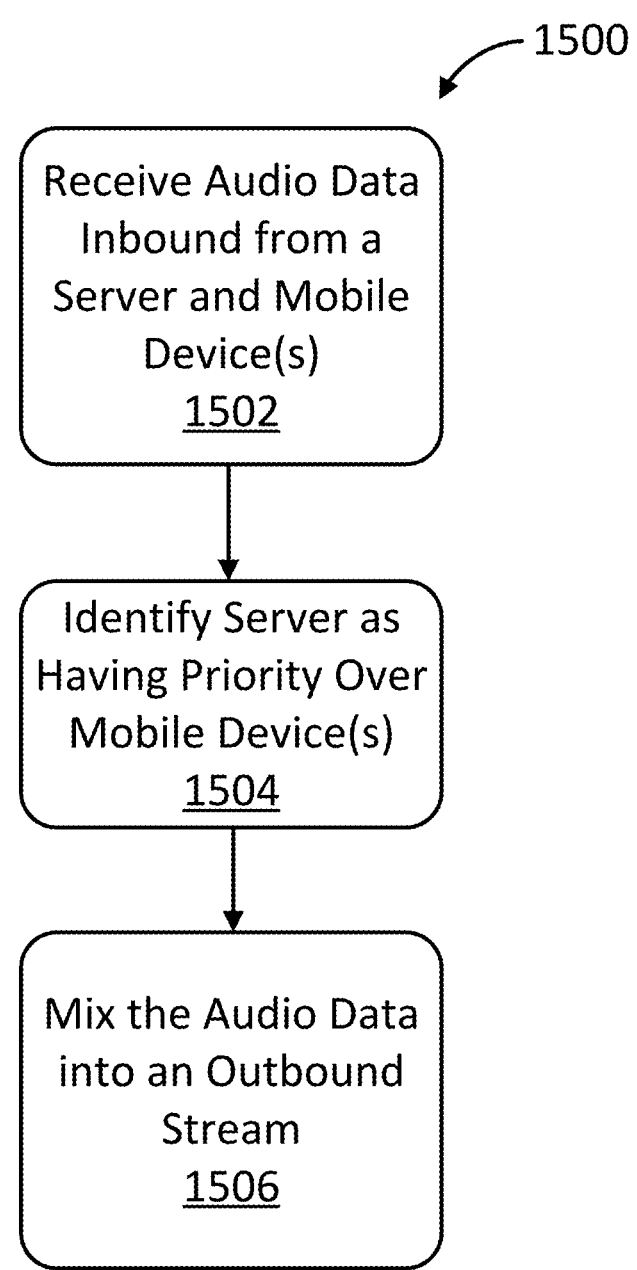
FIG. 15 is a flow diagram of a stream creation process, according to some examples described herein.

Turning now to FIG. 15, a flow diagram of a process for creating a stream of audio data is illustrated. The diagram illustrates a process 1500 for creating a stream of outbound audio data from multiple inbound streams of audio data. In some examples, the stream creation device 1402 of FIG. 14 is configured to execute the process 1500. The process 1500 includes the steps of receiving 1502 inbound audio data from a server and/or a mobile device, identifying 1504 the server as having priority over the mobile device, and mixing 1506 the audio data into an outbound stream. Each of these processes 1502, 1504, 1506 is described in greater detail below with respect to FIGS. 17-19, respectively.

Figure 16:
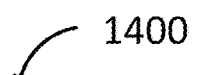
FIG. 16 is a schematic diagram illustrating the audio processing device of FIG. 14 with additional detail, according to some examples described herein.

Turning now to FIG. 16, a system of audio data process- ing is schematically illustrated. The system illustrates the process 1400 described above with respect to FIG. 14, with additional structure shown for the stream creation device 1402. As shown, the stream creation device 1402 may include an SFU 710, which is in turn configured to establish a virtual room 702. The SFU 710 and virtual room 702 may be configured to receive audio data from devices connected to the virtual room (such as the computing device 518 or the customer device 122) and transmit the audio data to a virtual camera 704 within the stream creation device 1402. The virtual camera 704 may further process (e.g., filter) the audio data to produce a stream of outbound priority audio data. Outbound priority audio data may be sent to a monitoring device 708 or to another kind of device.

Figure 17:
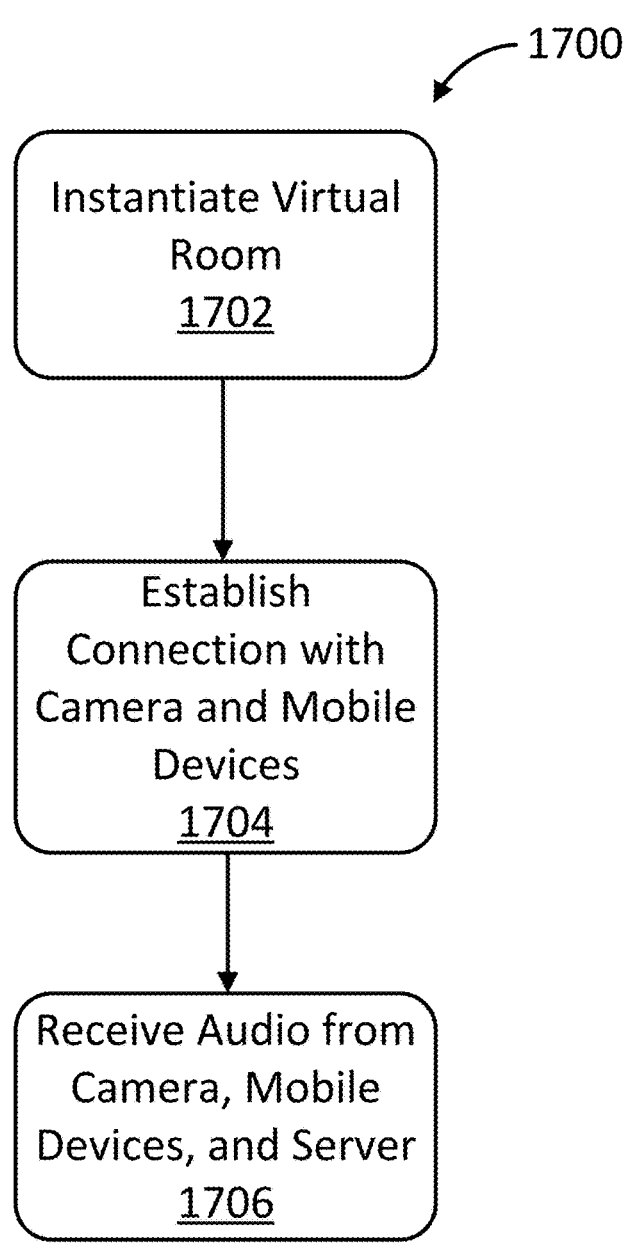
FIG. 17 is a flow diagram for a process of receiving audio data, according to some examples described herein.

FIG. 17 Illustrates a flow diagram of a process 1700 for receiving inbound audio data from a number of devices, including a camera, a mobile device, and a server. The process 1700 may be executed within the operation 1502 of FIG. 15, in some examples. The process 1700 can be executed, in some examples, by a device or service, such as the stream creation device 1402 of FIG. 14. In some cases, at least a portion of the process 1700 may be executed by other devices or services, such as the virtual camera 704 of FIGS. 7 & 16. The process 1700 begins, in some examples, by instantiating 1502 a virtual room. Once the virtual room is created, connections are established 1704 with devices requesting to connect to the virtual room, including at least a camera, a mobile device, and/or a server. Once connections have been established, the virtual room may receive 1706 streams of audio data from each connected device.

In some cases, the virtual room may be instantiated 1702 by a selective forwarding unit (SFU), such as the SFU 710 of FIGS. 7 & 16, that organizes connections (e.g., WebRTC connections) into groups that share media streams with each other. One example of an SFU 710 can be found within the LiveKit SFU package available at github.com. The virtual room, once instantiated, may operate as the virtual room 702, described above with respect to FIGS. 7 and 10, including connecting to other devices and enabling them to share data among devices connected to the virtual room.

Connections between each device and the virtual room may be established 1704 via one or more individual WebRTC connections between the device and the SFU. Likewise, in some examples, the SFU 710 is configured to interoperate with the devices to establish the individual WebRTC connections. Once the WebRTC connections are established, the SFU may begin to receive 1706 data, such as a stream of audio data, from the connected devices.

Figure 18:
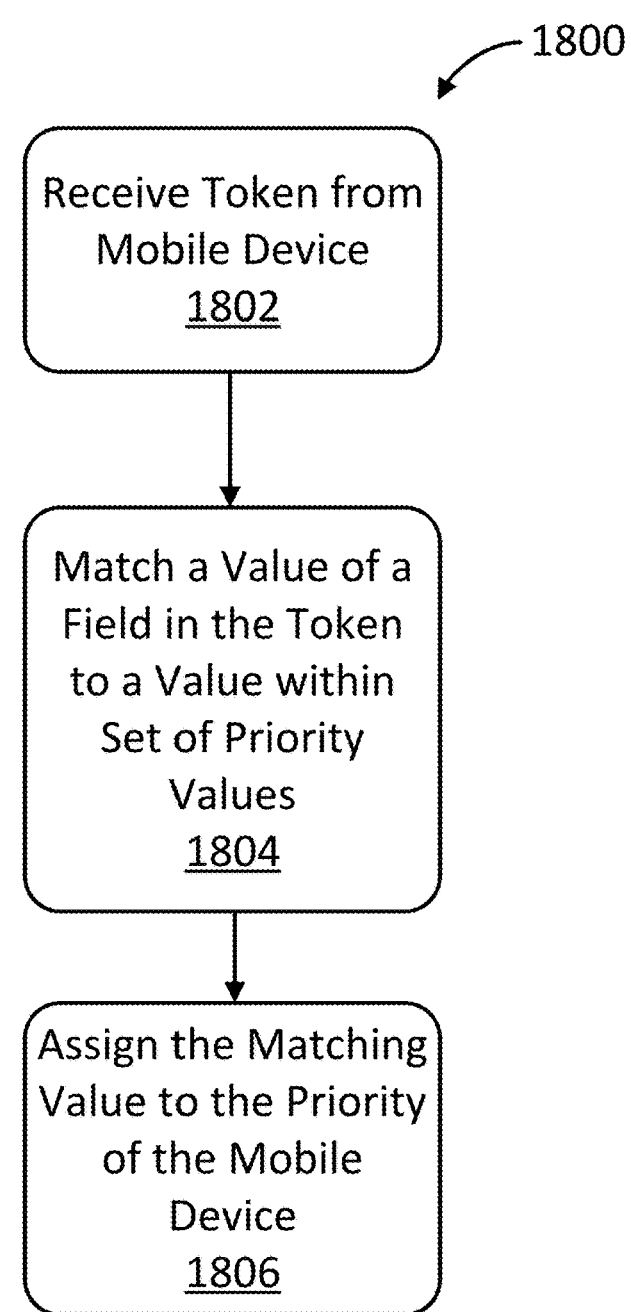
FIG. 18 is a flow diagram for a process of identifying device priority, according to some examples described herein.

Turning now to FIG. 18, a flow diagram for a process 1800 of identifying priority data from inbound audio data to create an outbound stream is illustrated. The process 1800 may be executed within the operation 1504 of FIG. 15, in some examples. The process 1800 may be performed, in some cases, by the stream mixing device 1402 of FIG. 14 or the virtual camera 704 of FIGS. 7, 10, and 16. The process 1800 includes the steps of receiving 1802 a token from a connecting mobile device, matching 1804 a value of a field in the token with a value within a set of priority values, and assigning 1806 the matching value to the priority value of the mobile device. In cases where the method is implemented by the stream mixing device 1402, the stream mixing device 1402 may be configured to receive inbound audio data from one or more devices and output outbound audio data to a connected device, such as the monitoring device 708 of FIGS. 14 & 16. In cases where the method is implemented by the virtual camera 704, the virtual camera 704 may be configured to receive inbound audio data from a virtual room 702 (which may be established by an SFU 710) and output priority audio data to a connected device.

The process 1800 begins, in some examples, with receiving 1802 a token from a mobile device. The token may be received, for example, within a request from the mobile device to connect to a virtual room. A process of supplying connecting devices with tokens, including information contained within the token, is discussed above with respect to FIGS. 7 & 10. In the process 1800, the mobile device may in some cases be issued a token by the virtual camera 704 or another service upon attempting to connect to a virtual room. The process 1800 proceeds when the token is received 1802 at its destination, which may be a virtual camera 704, a stream mixing device 1402, or another object or service.

When the token has been received 1802 from the connecting mobile device, it is then analyzed (e.g., parsed) by the stream creation device 1402 or other object executing the process 1800 to extract and match 1804 a value of a field in the token to a value within a set of priority values. The token may include multiple fields with values, including at least a priority field for a priority value. The stream creation device 1402 or other object executing the method may also have a set of priority values which correspond to different levels of permission to modify the operation of the virtual room. For example, the stream creation device 1402 might recognize a priority value of "Customer," "Camera," or "Agent" within the token and match that value with a set of priority values within the stream creation device 1402 which define the permissions associated with that authority. In other cases, the tokens may contain different priority values, such as additional roles or numeric identifiers which correspond to roles. Once the priority value of the token is extracted and matched 1804 with one of the priority values of the set of priority values of the stream creation device 1402, the method continues by assigning 1806 the matched priority value to the connected mobile device associated with the token to grant that mobile device permissions corresponding to that priority within the virtual room. In some configurations, the device executing the process may identify connected devices which have particular roles or priorities and designate audio data from those devices, roles, or priorities to constitute an outbound stream of priority audio data. It should be noted that, in some examples, the operations 1804 and 1806 may simply extract a priority value and assign the extracted priority value to the device requesting a connection to the virtual room.

Figure 19:
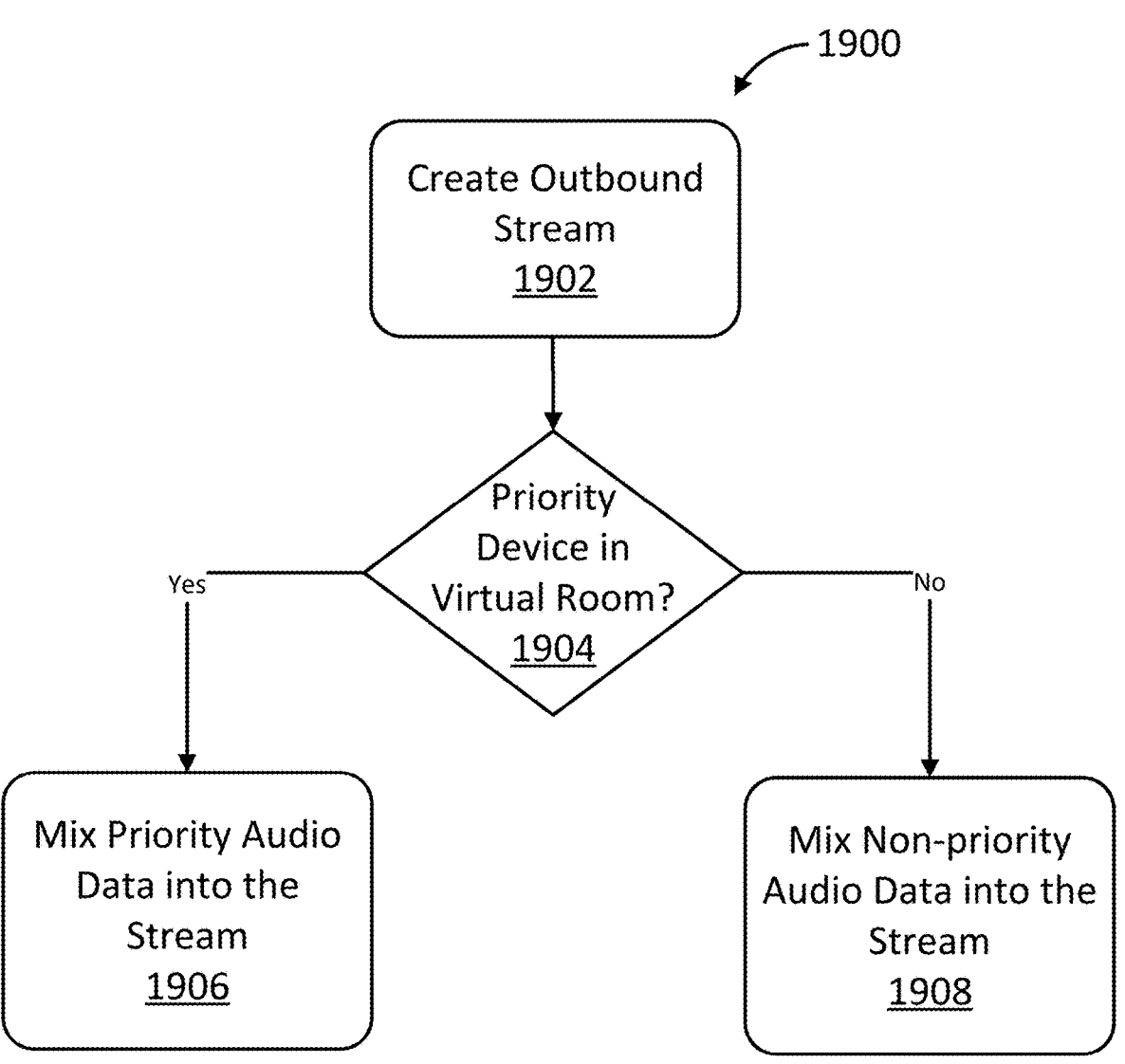
FIG. 19 is a flow diagram for a process of mixing audio data, according to some examples described herein.

Turning now to FIG. 19, a flow diagram for a process 1900 of mixing audio data to create an outbound stream is illustrated. The process 1900 may be executed within the operation 1506 of FIG. 15, in some examples. Audio data may be mixed from a plurality of inbound audio data streams, which may include audio data streams from devices connected to a virtual room 702 or to a stream creation device 1402. As shown in FIG. 19, the process 1900 starts with creation of an audio stream. For instance, in some examples, the device executing the process 1900 may identify inbound audio data with the highest priority and may create 1902 an outbound audio stream that includes the highest priority audio data. Where two or more sets of inbound audio data have the same priority, the device executing the process 1900 may select either of the sets of inbound audio data and may include the selected inbound audio data in the outbound audio stream.

Continuing with the process 1900, the device identifies 1904 whether a priority device is in or connected to the virtual room. "Priority device" here may mean a connected device having priority above a particular threshold or a connected device having authority above other connected devices (as may be the case when one "agent" device and several "customer" devices are connected). There may be several ways in which a priority device may be identified 1904 among a plurality of devices connected to the virtual room. In one instance, one connected device has higher priority than each of the other connected devices, making it the priority device. In another instance, a first plurality of connected devices has the same priority, which is higher than the priority of a second plurality of devices. In that instance, each of the devices of the first plurality may be identified as priority devices. If one or more priority devices are identified in the virtual room, then outbound priority audio data may mix 1906 only the audio data originating from the priority devices into the outbound audio data stream. Alternatively, if there is no priority device identified 1904 in the virtual room (i.e., all connected devices have priority below the threshold and/or all connected devices possess the same priority), then inbound audio data from the non-priority devices may be mixed 1908 into the stream of outbound priority audio data.

Various innovative concepts may be embodied as one or more methods, of which examples have been provided. The acts performed as part of a method may be ordered in any suitable way. Accordingly, examples may be constructed in which acts are performed in an order different than illustrated, which may include performing some acts simultaneously, even though shown as sequential acts in illustrative examples.

Descriptions of additional examples follow. Other variations will be apparent in light of this disclosure.

Example 1 a method comprising sharing audio data among a plurality of devices including a camera and a mobile device; identifying the server as having priority over the mobile device; adding the server to the plurality of devices; and muting the mobile device in response to identification of the server as having priority over the mobile device and addition of the server to the plurality of devices.

Example 2 includes the method of example 1, further comprising generating a token; communicating the token to the mobile device; and establishing a first connection between the mobile device and the plurality of devices based on the token.

Example 3 includes the method of example 2, wherein establishing the first connection comprises confirming that the token authorizes access to the plurality of devices and that the token is unexpired.

Example 4 includes the method of example 2, wherein generating the token comprises embedding a value in a priority field within the token.

Example 5 includes the method of example 4, wherein identifying the server as having priority over the mobile device includes accessing the value in the priority field of the token.

Example 6 includes the method of example 1, further comprising establishing a second connection between the server and the plurality of devices; and displaying a notification, via the mobile device, in response to establishing the second connection.

Example 7 includes the method of example 5, the method further comprising receiving, via the server, input requesting additional audio data received from the mobile device be included in the audio data; and mixing, in response to the input, the additional audio data into the audio data.

Example 8 is a system comprising memory; and at least one processor coupled with the memory and configured to perform operations, the operations comprising sharing audio data among plurality of devices including a camera and a mobile device; identifying the server as having priority over the mobile device; adding the server to the plurality of devices; and muting the mobile device in response to identification of the server as having priority over the mobile device and addition of the server to the plurality of devices.

Example 9 includes the system of example 8, the operations further comprising generating a token; communicating the token to the mobile device; and establishing a first connection between the mobile device and the plurality of devices based on the token.

Example 10 includes the system of example 9, wherein establishing the first connection comprises confirming that the token authorizes access to the plurality of devices and that the token is unexpired.

Example 11 includes the system of example 9, wherein generating the token comprises embedding a value in a priority field within the token.

Example 12 includes the system of example 11, wherein identifying the server as having priority over the mobile device comprises accessing the value in the priority field of the token.

Example 13 includes the system of example 8, the operations further comprising establishing a second connection between the server and the plurality of devices; and displaying a notification, via the mobile device, in response to establishing the second connection.

Example 14 includes the system of example 8, the operations further comprising receiving, via the server, input requesting additional audio data received from the mobile device be included in the audio data; and mixing, in response to the input, the additional audio data into the audio data.

Example 15 is a non-transitory memory device storing instructions that when executed cause a hardware processor to perform operations, the operations comprising sharing audio data among a plurality of devices including a camera and a mobile device; identifying a server as having priority over the mobile device; adding the server to the plurality of devices; and muting the mobile device in response to identification of the server as having priority over the mobile device and addition of the server to the plurality of devices.

Example 16 includes the non-transitory memory device of example 15, the operations further comprising generating a token; communicating the token to the mobile device; and establishing a first connection between the mobile device and the plurality of devices based on the token.

Example 17 includes the non-transitory memory device of example 16, wherein establishing the first connection comprises confirming that the token authorizes access to the plurality of devices and that the token is unexpired.

Example 18 includes the non-transitory memory device of example 16, wherein generating the token comprises embedding a value in a priority field within the token.

Example 19 includes the non-transitory memory device of example 15, the operations further comprising: establishing a second connection between the server and the plurality of devices; and displaying a notification, via the mobile device, in response to establishing the second connection.

Example 20 includes the non-transitory memory device of example 15, the operations further comprising receiving, via the server, input requesting additional audio data received from the mobile device be included in the audio data; and mixing, in response to the input, the additional audio data into the audio data.

Example 21 is a system comprising memory; and a mechanism for creating a stream of outbound priority audio data from inbound non-priority audio data and inbound priority audio data.

Example 22 includes the system of example 21, wherein the mechanism for creating the stream comprises a mechanism for receiving audio data from a plurality of devices, including a server and a mobile device; a mechanism for identifying the server as having priority over the mobile device; and a mechanism for mixing, based on identification of the server as having priority over the mobile device, the audio data into the stream.

Example 23 includes the system of example 22, wherein the mechanism for receiving the data comprises executable instructions configured to create a virtual room.

Example 24 includes the system of example 22, wherein the mechanism for identifying the server as having priority over the mobile device comprises executable instructions configured to match a token received from the mobile device to a predefined value.

Example 25 includes the system of example 22, wherein the mechanism for mixing the audio data comprises executable instructions configured to selectively mix the non-priority audio data from the mobile device and priority audio data from the server.

Use of ordinal terms such as "first," "second," "third," etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term).

Examples of the methods and systems discussed herein are not limited in application to the details of construction and the arrangement of components set forth in the following description or illustrated in the accompanying drawings. The methods and systems are capable of implementation in other examples and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, components, elements or acts of the systems and methods herein referred to in the singular can also embrace examples including a plurality, and any references in plural to any example, component, element or act herein can also embrace examples including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" can be construed as inclusive so that any terms described using "or" can indicate any of a single, more than one, and all of the described terms. In addition, in the event of inconsistent usages of terms between this document and documents incorporated herein by reference, the term usage in the incorporated references is supplementary to that of this document; for irreconcilable inconsistencies, the term usage in this document controls.

Having described several examples in detail, various modifications and improvements will readily occur to those skilled in the art. Such modifications and improvements are intended to be within the scope of this disclosure. Accordingly, the foregoing description is by way of example only, and is not intended as limiting.

The invention claimed is:

1. A method comprising:
receiving, by a server, audio data among a plurality of devices including a camera, a computing device, and a mobile device, the computing device to enable interaction between a monitoring agent and the camera, the camera to monitor a location for activity and to transmit audio to persons at the location after detection of activity;
identifying, by the server, a priority of the computing device, the priority indicating that the camera is to output audio data from the computing device instead of audio data from the mobile device; and
transmitting, by the server, audio data from the computing device to the camera based on the priority of the computing device.

2. The method of claim 1, further comprising:
generating a token;
communicating the token to the mobile device; and
establishing a first connection between the mobile device and the plurality of devices based on the token.

3. The method of claim 2, wherein establishing the first connection includes confirming that the token authorizes access to the plurality of devices and that the token is unexpired.

4. The method of claim 2, wherein generating the token comprises embedding a value in a priority field within the token.

5. The method of claim 4, wherein identifying the priority of the computing device includes accessing the value in the priority field of the token.

6. The method of claim 5, the method further comprising:
receiving, via the server, input requesting additional audio data received from the mobile device be included in the audio data; and
mixing, in response to the input, the additional audio data into the audio data.

7. The method of claim 1, further comprising:
establishing a second connection between the server and the plurality of devices; and
displaying a notification, via the mobile device, in response to establishing the second connection.

8. A system comprising:
memory; and
at least one processor coupled with the memory and configured to perform operations, the operations comprising:
receiving, by a server, audio data among a plurality of devices including a camera, a computing device, and a mobile device, the computing device to enable interaction between a monitoring agent and the camera, the camera to monitor a location for activity and to transmit audio to persons at the location after detection of activity;
identifying, by the server, a priority of the computing device, the priority indicating that the camera is to output audio data from the computing device instead of audio data from the mobile device; and
transmitting, by the server, audio data from the computing device to the camera based on the priority of the computing device.

9. The system of claim 8, the operations further comprising:
generating a token;
communicating the token to the mobile device; and
establishing a first connection between the mobile device and the plurality of devices based on the token.

10. The system of claim 9, wherein establishing the first connection comprises confirming that the token authorizes access to the plurality of devices and that the token is unexpired.

11. The system of claim 9, wherein generating the token comprises embedding a value in a priority field within the token.

12. The system of claim 11, wherein identifying the priority of the computing device comprises accessing the value in the priority field of the token.

13. The system of claim 8, the operations further comprising:
establishing a second connection between the server and the plurality of devices; and
displaying a notification, via the mobile device, in response to establishing the second connection.

14. The system of claim 8, the operations further comprising:
receiving, via the server, input requesting additional audio data received from the mobile device be included in the audio data; and
mixing, in response to the input, the additional audio data into the audio data.

15. A non-transitory memory device storing instructions that when executed cause a hardware processor to perform operations, the operations comprising:
receiving, by a server, audio data among a plurality of devices including a camera, a computing device, and a mobile device, the computing device to enable interaction between a monitoring agent and the camera, the camera to monitor a location for activity and to transmit audio to persons at the location after detection of activity;

identifying, by the server, a priority of the computing device, the priority indicating that the camera is to output audio data from the computing device instead of audio data from the mobile device; and transmitting, by the server, audio data from the computing device to the camera based on the priority of the computing device.

16. The non-transitory memory device of claim 15, the operations further comprising:

generating a token;

communicating the token to the mobile device; and establishing a first connection between the mobile device and the plurality of devices based on the token.

17. The non-transitory memory device of claim 16, wherein establishing the first connection comprises confirming that the token authorizes access to the plurality of devices and that the token is unexpired.

18. The non-transitory memory device of claim 16, wherein generating the token comprises embedding a value in a priority field within the token.

19. The non-transitory memory device of claim 15, the operations further comprising:

establishing a second connection between the server and the plurality of devices; and displaying a notification, via the mobile device, in response to establishing the second connection.

20. The non-transitory memory device of claim 15, the operations further comprising:

receiving, via the server, input requesting additional audio data received from the mobile device be included in the audio data; and mixing, in response to the input, the additional audio data into the audio data.

* * * * *